United States Patent
Morris et al.

(10) Patent No.: US 12,528,691 B2
(45) Date of Patent: Jan. 20, 2026

(54) DISPENSER HEALTH MONITORING AND HEALTHY DISPENSER REPLICATION

(71) Applicant: Wayne Fueling Systems LLC, Austin, TX (US)

(72) Inventors: John Joseph Morris, Austin, TX (US); Rohith Chinnaswamy, Round Rock, TX (US); Mark Kobayashi, Austin, TX (US)

(73) Assignee: Wayne Fueling Systems LLC, Austin, TX (US)

( * ) Notice: Subject to any disclaimer, the term of this patent is extended or adjusted under 35 U.S.C. 154(b) by 5 days.

(21) Appl. No.: 18/478,682

(22) Filed: Sep. 29, 2023

(65) Prior Publication Data

US 2024/0109766 A1 Apr. 4, 2024

Related U.S. Application Data

(60) Provisional application No. 63/479,130, filed on Jan. 9, 2023, provisional application No. 63/377,911, filed on Sep. 30, 2022.

(51) Int. Cl.
*B67D 7/14* (2010.01)
*G07F 9/00* (2006.01)
*H04L 67/00* (2022.01)

(52) U.S. Cl.
CPC .............. *B67D 7/145* (2013.01); *G07F 9/002* (2020.05); *H04L 67/34* (2013.01)

(58) Field of Classification Search
CPC ........ B67D 7/145; G06Q 20/18; H04L 67/34; G07F 9/006; G07F 9/002
(Continued)

(56) References Cited

U.S. PATENT DOCUMENTS

| 6,360,137 B1 * | 3/2002 | Royal, Jr. ............. | G07F 13/025 |
| | | | 700/231 |
| 6,442,448 B1 * | 8/2002 | Finley .................. | H04L 63/062 |
| | | | 700/231 |

(Continued)

FOREIGN PATENT DOCUMENTS

| WO | 2020263928 A1 | 12/2020 |
| WO | WO-2021051208 A1 * | 3/2021 |
| WO | 2024073731 A1 | 4/2024 |

OTHER PUBLICATIONS

International Search Report and Written Opinion Received for PCT Patent Application No. PCT/US2023/075611, mailed on Feb. 5, 2024, 11 pages.

(Continued)

*Primary Examiner* — Kenneth Rinehart
*Assistant Examiner* — Stephanie A Shrieves
(74) *Attorney, Agent, or Firm* — Mintz, Levin, Cohn, Ferris, Glovsky and Popeo, P.C.

(57) ABSTRACT

Various exemplary devices, systems, and methods for dispenser health monitoring and dispenser replication are provided. In one embodiment, such a system can include a first product dispenser located at a product dispensing station and configured in part for the delivery of a product to a vehicle in accordance with an optimized configuration, and the system can also include a second product dispenser located at the product dispensing station. The system can further include a site local server located at the product dispensing station that is in operable communication with each of the first product dispenser and the second product dispenser. The site local server can be configured to receive configuration data characterizing the first configuration and to transmit the configuration data to the second product dispenser for implementation thereon.

20 Claims, 20 Drawing Sheets

(58) Field of Classification Search
USPC .......................................................... 141/94
See application file for complete search history.

(56) References Cited

U.S. PATENT DOCUMENTS

| | | | | |
|---|---|---|---|---|
| 7,254,463 B1* | 8/2007 | Moore | ................... | B67D 7/04 |
| | | | | 222/2 |
| 7,941,289 B2* | 5/2011 | Harrell | ................... | G01F 25/17 |
| | | | | 702/100 |
| 8,925,808 B2* | 1/2015 | Harrell | ................. | G07F 13/025 |
| | | | | 235/375 |
| 9,830,764 B1 | 11/2017 | Murphy | | |
| 10,214,411 B2 | 2/2019 | Fieglein et al. | | |
| 10,269,082 B2 | 4/2019 | Morris et al. | | |
| 10,577,237 B2 | 3/2020 | Fieglein | | |
| 10,579,362 B1 | 3/2020 | Maehler et al. | | |
| 10,726,508 B2 | 7/2020 | Morris et al. | | |
| 11,276,051 B2 | 3/2022 | Tang et al. | | |
| 11,429,945 B2 | 8/2022 | Fieglein et al. | | |
| 2006/0079995 A1* | 4/2006 | Warn | ..................... | G07F 13/02 |
| | | | | 700/239 |
| 2008/0195251 A1* | 8/2008 | Milner | ................. | B67D 3/0077 |
| | | | | 222/1 |
| 2009/0065570 A1* | 3/2009 | Peters | ................... | B67D 1/0888 |
| | | | | 705/413 |
| 2013/0126042 A1 | 5/2013 | Dewald et al. | | |
| 2015/0005935 A1* | 1/2015 | Bae | ..................... | G07F 17/0092 |
| | | | | 700/241 |
| 2015/0242969 A1* | 8/2015 | Pallas | .................... | B67D 7/145 |
| | | | | 705/39 |
| 2015/0368088 A1* | 12/2015 | Patel | .................. | G06Q 30/0226 |
| | | | | 700/283 |
| 2017/0355588 A1 | 12/2017 | Fieglein | | |
| 2022/0346591 A1* | 11/2022 | Knowles | ............. | A47J 31/4492 |
| 2023/0196360 A1 | 6/2023 | Weston et al. | | |

OTHER PUBLICATIONS

Anonymous (2021) "DX Monitor (TM) Remote Monitoring and Management Solution, Rev 06", https://support.doverfs.com/hc/en-us/article_attachments/14294502148755, 24 Pages.

* cited by examiner

605

Parameters to be saved:

| | |
|---|---|
| Install Mode | OnSite |
| | |
| Terminal Number | 2 |
| Contactless Reader | True |
| Timezone | CST6CDT |
| Terminal Network Configuration | |
| Address | 172.29.2.100 |
| Gateway | 172.29.2.1 |
| Subnet Mask | 255.255.255.0 |
| Preferred DNS | 8.8.8.8 |
| Alternate DNS | 8.8.4.4 |
| SPM2 | |
| Address | 172.29.2.100 |
| Gateway | 172.29.2.1 |
| Subnet Mask | 255.255.255.0 |
| POS | |
| Address | 192.168.31.11 |
| Port | 9700 |
| POS Type | Presentation |

< Back          Next

FIG. 6E

DISPENSER HEALTH MONITORING AND HEALTHY DISPENSER REPLICATION

CROSS-REFERENCE TO RELATED APPLICATIONS

This application claims priority to U.S. Provisional Patent Application No. 63/377,911 filed Sep. 30, 2022, entitled "Replication of a Healthy Fueling Point" and U.S. Provisional Patent Application No. 63/479,130 filed Jan. 9, 2023, entitled "Dispenser Health Monitoring and Healthy Fueling Point Replication," which are hereby incorporated herein by reference in their entireties.

FIELD

The present disclosure relates generally to dispenser health monitoring and healthy dispenser replication.

BACKGROUND

The retail dispensing industry utilizes various types of product dispensers (e.g., fuel dispensers, electric charging stations, hydrogen dispensers, etc.) for dispensing products to customers. Each product dispenser can feature a configuration by which the dispenser operates to dispense the products to the customers. There may be instances at dispensing stations where there is an optimized "healthy" dispenser configuration that is utilized by one dispenser at the dispensing station. However, as each product dispenser at a dispensing station features a specific configuration attributable to that product dispenser, it can be difficult to ensure that each product dispenser located at a dispensing station is optimally configured to dispense the products to the customers at the dispensing station.

Accordingly, there remains a need for improved techniques for configuration of product dispensers.

SUMMARY

In general, devices, systems, and methods for dispenser health monitoring and healthy dispenser replication.

In one aspect, a system is provided, and the system can include a first product dispenser located at a product dispensing station and having first components for delivery of a product to a dispensing station user. The first components can be configured for the delivery of the product in accordance with a first configuration. The system can also include a second product dispenser located at the product dispensing station and having second components for the delivery of a product to a dispensing station user. The second components can be configured for the delivery of the product. The system can further include a site local server located at the product dispensing station and in operable communication with each of the first product dispenser and the second product dispenser. The site local server can be configured to receive configuration data characterizing the first configuration and to transmit the configuration data to the second product dispenser. Additionally, the second product dispenser can be configured to execute instructions that cause the second components to be configured for the delivery of the product in accordance with the first configuration.

In some embodiments, the site local server can be operably coupled to the first product dispenser and the second product dispenser. In some embodiments, the second components can be initially configured for the delivery of the product in accordance with a second configuration that differs from the first configuration, and the second product dispenser can be configured to execute instructions that cause the second components to be reconfigured for the delivery of the product in accordance with the first configuration. In some embodiments, the second product dispenser can include a graphical display configured to operate a graphical user interface for configuring the second components and to receive user inputs thereon, and the second product dispenser can be configured to execute the instructions in response to receipt of the user input at the graphical display. In some embodiments, the site local server can be configured to determine the instructions and to provide the instructions to the second product dispenser, and the instructions can be executed by the second product dispenser in response to receiving the instructions from the site local server.

In some embodiments, the configuration data can characterize a configuration of a payment terminal of the first product dispenser. In some embodiments, the configuration data can characterize one or more networking settings of the first product dispenser. In some embodiments, the configuration data can characterize a configuration of an operating platform of the first product dispenser.

In some embodiments, the first product dispenser can be configured to transmit the configuration data to the site local server. In such an embodiment, the first product dispenser can be configured to receive, from the site local server, a command that causes the first product dispenser to transmit the configuration data to the site local server.

In another aspect a computer-implemented method is provided that in one implementation can include receiving, from a site local server located at a product dispensing station and by a first product dispenser located at the product dispensing station, configuration data characterizing a configuration of a second product dispenser located at the product dispensing station. The first product dispenser can feature first components configured for the delivery of a product. The method can also include executing computational instructions that cause the first components to be configured for the delivery of the product in accordance with the configuration.

In some embodiments, the site local server can be operably coupled to the first product dispenser and the second product dispenser. In some embodiments, the first components can be initially configured for the delivery of the product in accordance with a second configuration differing from the configuration, and the computational instructions, when executed, can cause the first components to be reconfigured for the delivery of the product in accordance with the configuration. In some embodiments, the first product dispenser can include a graphical display configured to operate a graphical user interface for configuring the first components and to receive user inputs thereon, and the computational instructions can be executed in response to receipt of the user input at the graphical display. In some embodiments, the site local server can be configured to determine the computational instructions, and the computational instructions can be executed by the first product dispenser in response to receiving the computational instructions from the site local server.

In some embodiments, the configuration data can characterize a configuration of a payment terminal of the second product dispenser. In some embodiments, the configuration data can characterize one or more networking settings of the second product dispenser. In some embodiments, the configuration data can characterize a configuration of an operating platform of the second product dispenser.

In some embodiments, the method can further include receiving, by the site local server and from the second product dispenser, the configuration data. In some embodiments, the method can further include receiving, by the second product dispenser and from the site local server, a command that causes the second product dispenser to transmit the configuration data to the site local server.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF DRAWINGS

The embodiments described above will be more fully understood from the following detailed description taken in conjunction with the accompanying drawings. The drawings are not intended to be drawn to scale. For purposes of clarity, not every component may be labeled in every drawing. In the drawings:

FIG. 6E is a fifth view of the exemplary graphical user interface dashboard of FIG. 6A;

DETAILED DESCRIPTION

Figure 1:
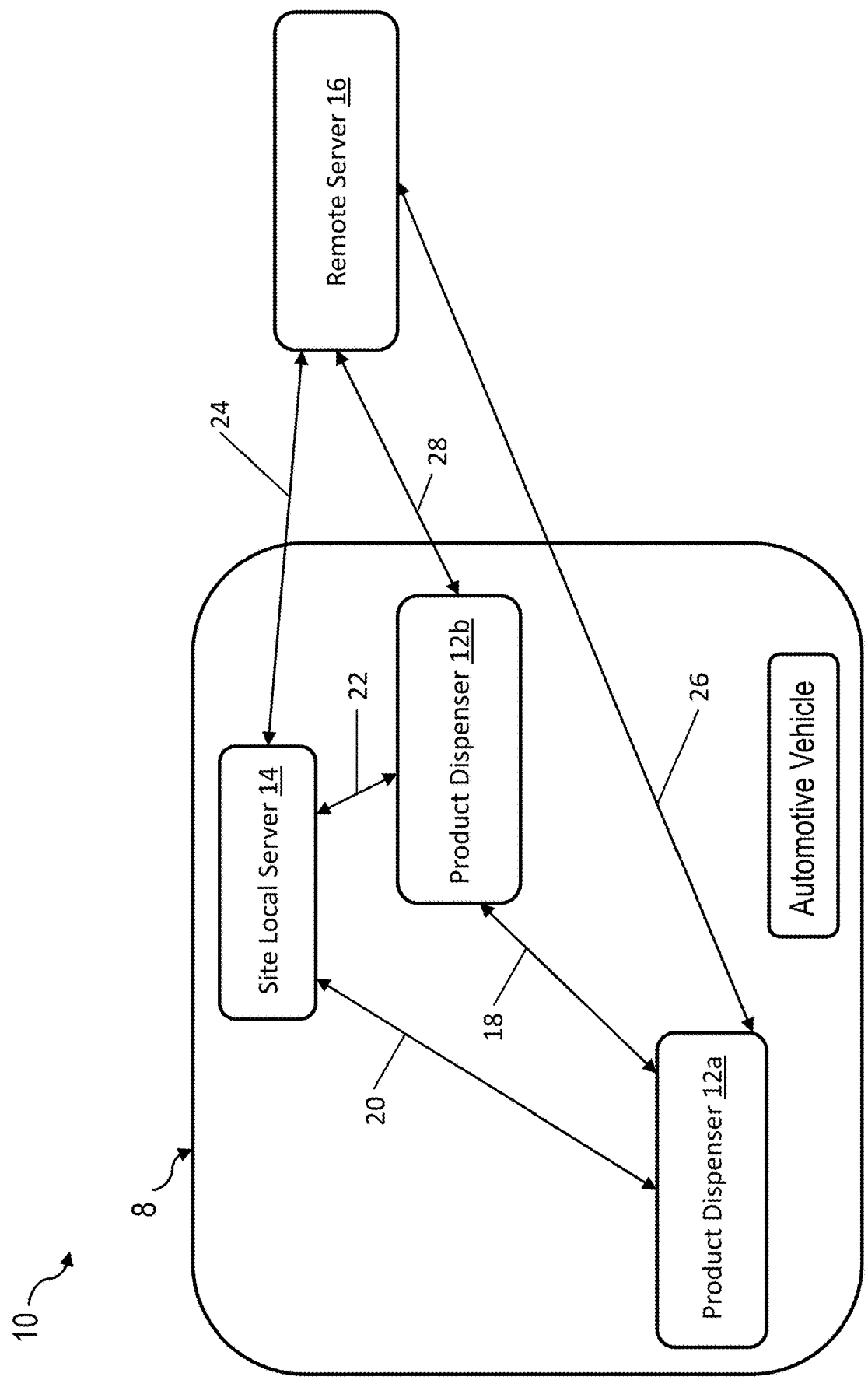
FIG. 1 is a schematic view of one implementation of a system for dispenser health monitoring and healthy dispenser replication.

Certain exemplary embodiments will now be described to provide an overall understanding of the principles of the structure, function, manufacture, and use of the devices, systems, and methods disclosed herein. One or more examples of these embodiments are illustrated in the accompanying drawings.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Sizes and shapes of the systems and devices, and the components thereof, can depend at least on the dimensions of the subject in which the systems and devices will be used, the size and shape of components with which the systems and devices will be used, and the methods with which the systems and devices will be used.

Various exemplary devices, systems, and methods for dispenser health monitoring and dispenser replication are provided. In one embodiment, such a system can include a first product dispenser located at a product dispensing station and configured in part for the delivery of a product to a product dispenser user in accordance with an optimized configuration, and the system can also include a second product dispenser located at the product dispensing station. The system can further include a site local server located at the product dispensing station that is in operable communication with each of the first product dispenser and the second product dispenser. The site local server can be configured to receive configuration data characterizing the first configuration and to transmit the configuration data to the second product dispenser. Based on configuration data directly received from the first product dispenser, or indirectly received from the first product dispenser via the site local server, the second product dispenser can be configured to execute instructions that cause the second components to be configured for the delivery of the product in accordance with the first configuration. With this functionality, an optimized, "healthy" product dispenser configuration that is optimized for the dispensing station can be directly imported to other product dispensers at the dispensing station lacking that configuration without the need for the product dispensers to be connected to off-site computing devices storing such optimized configurations. Such functionality can be particularly useful at dispensing stations installed at remote locations with little-to-no offsite connectivity with offsite networks, such as the Internet or a wide area network, where it is not possible to obtain such optimized product dispenser configurations from remote servers.

FIG. 1 illustrates one implementation of a system 10 that is configured for dispenser health monitoring and healthy dispenser replication. As shown, the system 10 includes a first product dispenser 12a that is configured to dispense a product available at a product dispensing station 8 and a second product dispenser 12b that is also configured to dispense a product available at the product dispensing station 8. While the functionality described herein is discussed with respect to the first product dispenser 12a and the second product dispenser 12b, it is possible that more than two product dispensers are present at a product dispensing station 8. Each of these additional product dispensers may feature some or all of the configuration and/or functionality discussed herein with respect to the first product dispenser 12a and/or the second product dispenser 12b.

The first and second product dispensers 12a, 12b can have a variety of forms. In an exemplary implementation, the product dispenser can include any dispenser configured to dispense a good. Examples of such product dispensers include fuel dispensers configured to dispense fuel, electrical charging kiosks configured to dispense electricity (such as for an electric vehicle, for a mobile phone, etc.), vending machines configured to dispense food, electronics, or other good, automated teller machines (ATMs) configured to dispense money, and the like. Examples of goods and services dispensed include fuel, a parking space, a pharmacy item, groceries to be delivered, electricity, a car wash, public transit, and the like. Some product dispensers can accept payment for goods and/or services without directly dispensing the product. Examples of dispensers configured to accept payment for goods and/or services without dispensing a good include parking meters, payment kiosks (such as at a parking garage, and the like), and the like. In addition, in some embodiments, the first product dispenser 12a may be configured to dispense a different type of good than the second product dispenser 12b (or other product dispensers located at a dispensing station). For example, in some embodiments, the first product dispenser 12a may be a fuel dispenser configured to dispense fuel, and the second product dispenser 12b may be an electrical charging kiosk configured to dispense electricity.

In some embodiments, the first product dispenser 12a and/or the second product dispenser 12b can include one or more components configured to deliver a good and/or service, and the one or more components can be configured to deliver the good and/or service in accordance with a particular hardware, software, and/or firmware configuration. The configuration can include computational instructions (e.g., commands, programs, and the like) that, when executed, cause the one or more components of the first product dispenser 12a and/or the second product dispenser 12b to be able to deliver the good and/or service. For example, the one or more components of the first product dispenser can include payment components that are configured to receive customer payment data (e.g., credit/debit card information, etc.) for the good and/or service, and the configuration can include computational instructions that, when executed, cause the payment components to process a payment transaction for the good and/or service using the received customer payment data. As another example, when the first product dispenser 12a and/or the second product dispenser 12b is configured as a fuel dispenser, the one or more components can include a fuel pump, and the configuration can include computational instructions that cause the fuel pump to dispense fuel in accordance with a payment transaction for the fuel. As yet another example, the one or more components of the first product dispenser can include communications components that permit the first product dispenser to communicate with external devices, and the configuration can include computational instructions that, when executed, cause the communications components to permit communication between a processor of the first product dispenser and processors of external devices, such as the site local server 14 and/or the remote server 16 referenced below.

Figure 2:
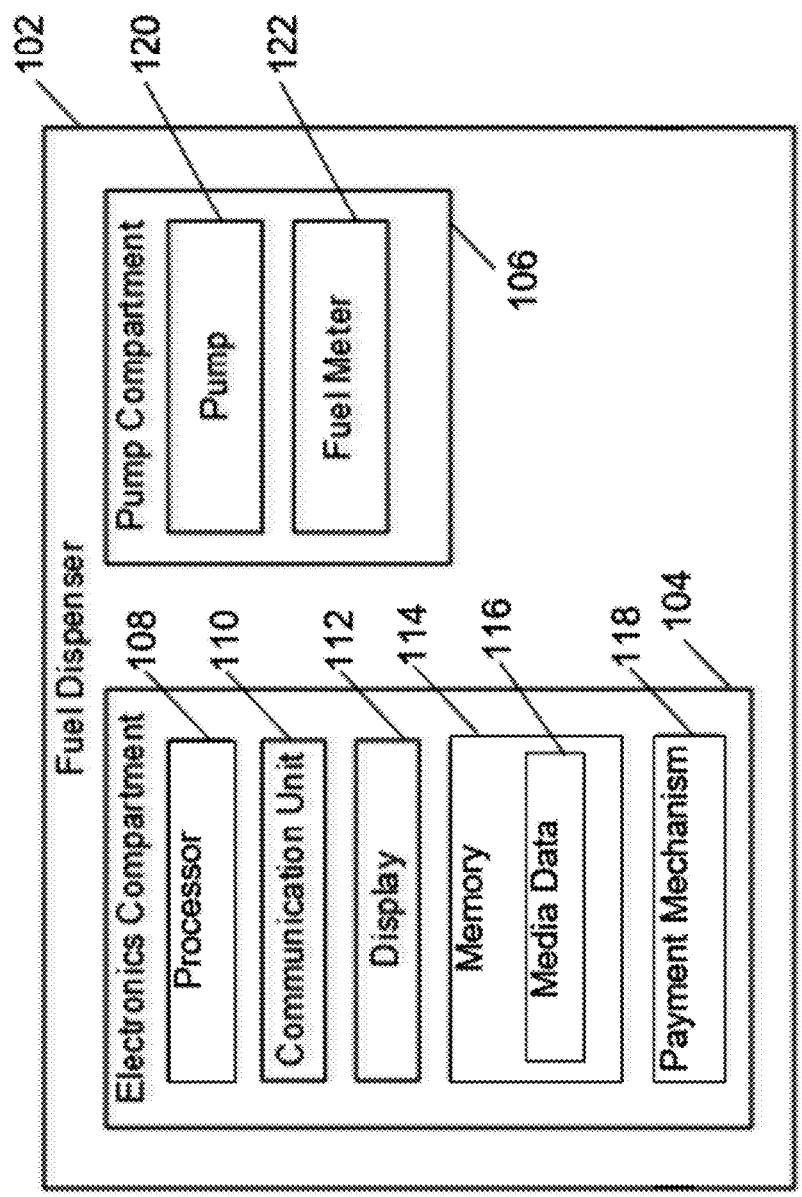
FIG. 2 is a schematic view of one implementation of a fuel dispenser.

FIG. 2 illustrates one implementation of an exemplary product dispenser—in this case, a fuel dispenser 102—that can be used as the first product dispenser 12a and/or the second product dispenser 12b of FIG. 1. As shown in FIG. 2, the fuel dispenser 102 includes an electronics compartment 104 and a pump compartment 106. The electronics compartment 104 has therein electronics for facilitating payment for fuel (and/or other good and/or services) and for facilitating the dispensing of the fuel. The electronics include, for example, a processor 108 configured to control various electronic components of the fuel dispenser 102 and dispensing of the fuel from the pump compartment 106, a communication unit 110 configured to electronically communicate wired and/or wirelessly over a network, a display 112 configured to show information (e.g., media content, payment information, etc.) thereon, a memory 114 configured to store data, including media data 116, therein that is readable by the processor 108, and a payment mechanism 118 (e.g., a card reader, a Near Field Communication (NFC) module, etc.) configured to facilitate payment for fuel (and/or other good and/or services). The fuel dispenser 102 can be configured for mobile payment in addition to (or instead of) payment through the fuel dispenser 102.

The display 112 is configured to show information to a user of the fuel dispenser 102. The display 112 can have any of a variety of configurations, such as a cathode ray tube (CRT) screen, a liquid crystal display (LCD) screen, a light emitting diode (LED) screen, a touchscreen, and the like. The display 112 can include a single display. Alternatively, the display 112 can include multiple displays. For example, a first display 112 can be on a front side of the fuel dispenser 102 and a second display 112 can be on a back side of the fuel dispenser 102. For another example, the display 112 can include two displays mounted next to each other to increase an overall display size. For yet another example, the display 112 can include first and second displays mounted next to each other on a front side of the fuel dispenser 102 and can include third and fourth mounted next to each other on a back side of the fuel dispenser 102.

The fuel dispenser 102 can, in some implementations, include at least one media output device in addition to the display 112. For example, the at least one media output device can include a speaker configured to output audio therefrom.

The communication unit 110 can have a variety of configurations. The communication unit 110 is configured to communicate wirelessly in an exemplary implementation, which may facilitate communication with a remote system (e.g., the remote server 12 of FIG. 1, etc.) and/or may facilitate setup of the communication. The communication unit 110 can be configured to facilitate wireless communication over a communication link and can include, e.g., a transceiver communicating via any of a variety of wireless techniques, e.g., Bluetooth protocol, cellular protocol, WIFI protocol, near field communication (NFC), a radio frequency identification (RFID) protocol, etc. Any of a variety of types of wireless connectivity hardware can be used for the wireless connectivity, as will be appreciated by a person skilled in the art. The wireless communication can be according to any of a variety of communication protocols, e.g., TCP/IP, etc., as will also be appreciated by a person skilled in the art. The wireless connectivity may facilitate wireless mesh network communication, as will be appreciated by a person skilled in the art. The types of wireless connectivity that the communication unit 110 includes can be chosen by an owner of the fuel dispenser 102 according to the owner's current fueling site setup and/or future fueling site plans, and the communication unit 110 may be manufactured and/or updated accordingly.

In some implementations, the communication unit 110 is configured to communicate over a wired connection in addition to or instead of over a wireless connection. A wired connection may be used, for example, for a local communication link between the fuel dispenser 102 and a local computing system external to the fuel dispenser 102 (e.g., an intermediary such as the Edge box 18 of FIG. 1, a point of sale (POS) configurator such as the POS configurator 36 of FIG. 1, etc.). A wired connection may provide more security and/or stability than a wireless connection and/or may allow a legacy fuel dispenser configured to communicate only via one or more wired connections to implement dynamic management of display content as described herein. Wired communication can occur via any of a variety of wired communication protocols, e.g., TCP/IP, etc., as will be appreciated by a person skilled in the art. Some fuel dispensers are manufactured with two-wire connectivity, and the wired communication can accordingly be via two wires, such as via a controller area network bus (CANBus) two wire connection, an RS485 two wire connection, a current loop connection, or other type of two wire connection. Some fuel dispensers are additionally or alternatively manufactured with cable connectivity and can accordingly be configured to provide wired communication via cable connection, such as an Ethernet cable or other network cable. Older fuel dispensers typically have two-wire connectivity capabilities while newer fuel dispensers typically have Ethernet connectivity capabilities instead.

The pump compartment 106 of the fuel dispenser 102 can, as in this illustrated implementation, have therein a pump 120 configured to pump fuel from a fuel tank or other reservoir and has therein a fuel meter 122 configured to monitor fuel flow. The pump compartment 106 can include other elements to facilitate fuel dispensing, such as valves, a vapor recovery system, etc., as will be appreciated by a person skilled in the art. Fuel is configured to flow through the pump compartment 106 to a hose (not shown) and out of a nozzle (not shown) at an end of the hose. The fuel dispenser 102 can include any number of hoses and associated nozzles.

A person skilled in the art will appreciate that the fuel dispenser 102 of FIG. 2 can have various other configurations. Various exemplary embodiments of fuel dispensers are described further in, for example, U.S. Pat. No. 10,214,411 entitled "Fuel Dispenser Communication" issued Feb. 26, 2019, U.S. Pat. No. 10,269,082 entitled "Intelligent Fuel Dispensers" issued Apr. 23, 2019, U.S. Pat. No. 10,577,237 entitled "Methods And Devices For Fuel Dispenser Electronic Communication" issued Mar. 3, 2020, U.S. Pat. No. 10,726,508 entitled "Intelligent Fuel Dispensers" issued Jul. 28, 2020, U.S. Pat. No. 11,276,051 entitled "Systems And Methods For Convenient And Secure Mobile Transactions" issued Mar. 15, 2022, U.S. Pat. No. 11,429,945 entitled "Outdoor Payment Terminals" issued Aug. 30, 2022, and U.S. Pat. App. Pub. No. 2023/0196360 entitled "Conducting Fuel Dispensing Transactions" published Jun. 22, 2023, which are hereby incorporated by reference in their entireties.

In some embodiments, a product dispenser (e.g., the first product dispenser 12a and/or the second product dispenser 12b of FIG. 1, the fuel dispenser 102 of FIG. 2, etc.) can be configured to dispense type(s) of "fuel" besides a petroleum fuel. For example, the fuel dispenser can be configured to dispense hydrogen, liquid propane gas (LPG) or compressed natural gas (CNG), diesel exhaust fluid (DEF) water, or the like. It will be understood that the fueling stations and the fuel dispensers described herein are not limited to petroleum gasoline in liquid format and that other types of fuel dispensers configured to dispense alternate types of "fuel" can be envisioned. For example, in some embodiments, the fuel dispenser can be a hydrogen fuel dispenser. For another example, in some embodiments, the fuel dispenser can be a natural gas fuel dispenser.

Referring again to FIG. 1, the system 10 also includes a site local server 14. In this exemplary implementation, the site local server 14 may be configured as a computing system in the form of a server. As in this illustrated implementation, the site local server 14 can be a local server located at a same product dispensing station 8 as the first product dispenser 12a and the second product dispenser 12b. In an exemplary implementation, the site local server 14 is configured to perform at least some forecourt control functions traditionally performed by a forecourt controller, to serve as an intermediary interface between the first product dispenser 12a and the second product dispenser 12b (and any other product dispensers at a same fueling site as the first product dispenser 12a and the second product dispenser 12b), to serve as an intermediary interface between the first product dispenser 12a and/or the second product dispenser 12b and the remote server 16 as discussed in further detail below, and to serve as a data collection device. In other implementations, at least one other intermediary can replace the site local server 14, such as a forecourt controller or other computing system. Additionally, although the site local server 14 in this illustrated implementation is located at a same product dispensing station 8 as the first product dispenser 12a and the second product dispenser 12b, at least one intermediary configured to be communicatively coupled with the first product dispenser 12a and the second product dispenser 12b can be located offsite so as to not be located at a same product dispensing station 8 as the first product dispenser 12a and the second product dispenser 12b.

As referenced above, the system 10 also includes a remote server 16 that is configured to provide a variety of functions to facilitate a transaction at the first product dispenser 12a and/or the second product dispenser 12b. For example, the remote server 16 can include a computing system that is configured to provide centralized, remote monitoring of the first product dispenser 12a and/or the second product dispenser 12b (e.g., remote monitoring of product dispenser software and/or firmware). One exemplary implementation of the remote server 16 is the DX Monitor™ available from Dover Fueling Solutions of Austin, TX.

The first product dispenser 12a is configured to communicate, e.g., using a communication unit such as the communication unit 110 of FIG. 2, with the second product dispenser 12b over a first communication link 18. Similarly, the second product dispenser 12b is configured to communicate, e.g., using a communication unit such as the communication unit 110 of FIG. 2, with the first product dispenser 12a over the first communication link 18. As will be appreciated by a person skilled in the art, the first communication link 18 can include a single communication link or a plurality of interconnected communication links. The communication over the first communication link 18 between the first product dispenser 12a and the second product dispenser 12b can be wired or wireless over a local area network.

The first product dispenser 12a is configured to communicate, e.g., using a communication unit such as the communication unit 110 of FIG. 2, with the site local server 14 over a second communication link 20, and, similarly, the second product dispenser 12b is configured to communicate, e.g., using a communication unit such as the communication unit 110 of FIG. 2, with the site local server 14 over a third communication link 22. In such a setup, the first product dispenser 12a is configured to communicate indirectly with the second product dispenser 12b via at least one intermediary, which is a single intermediary (the site local server 14) in this illustrated implementation. As will be appreciated by a person skilled in the art, each of the second and third communication links 20, 22 can include a single communication link or a plurality of interconnected communication links. The communication over the second communication link 20 between the first product dispenser 12a and the site local server 14, and the communication over the third communication link 22 between the second product dispenser 12b and the site local server 14, can be wired or wireless over a local area network.

As shown in FIG. 1, the site local server 14 is configured to communicate with the remote server 16 over a fourth communication link 24. As will be appreciated by a person skilled in the art, the fourth communication link 24 can include a single communication link or a plurality of interconnected communication links. The communication over the fourth communication link 24 between the site local server 14 and the remote server 16 is wireless over a network (e.g., the Internet, a wireless wide area network, a local area network, a wide area network, or the like).

In some implementations, in addition to or instead of being configured to communicate indirectly with the remote server 16, the first product dispenser 12a is configured to communicate directly with the remote server 16 over a fifth communication link 26, and the second product dispenser 12b is configured to communicate directly with the remote server 16 over a sixth communication link 28. The communication over the fifth and sixth communication links 24, 26 is wireless over a network (e.g., the Internet, a wireless wide area network, a local area network, a wide area network, or the like).

Figure 3:
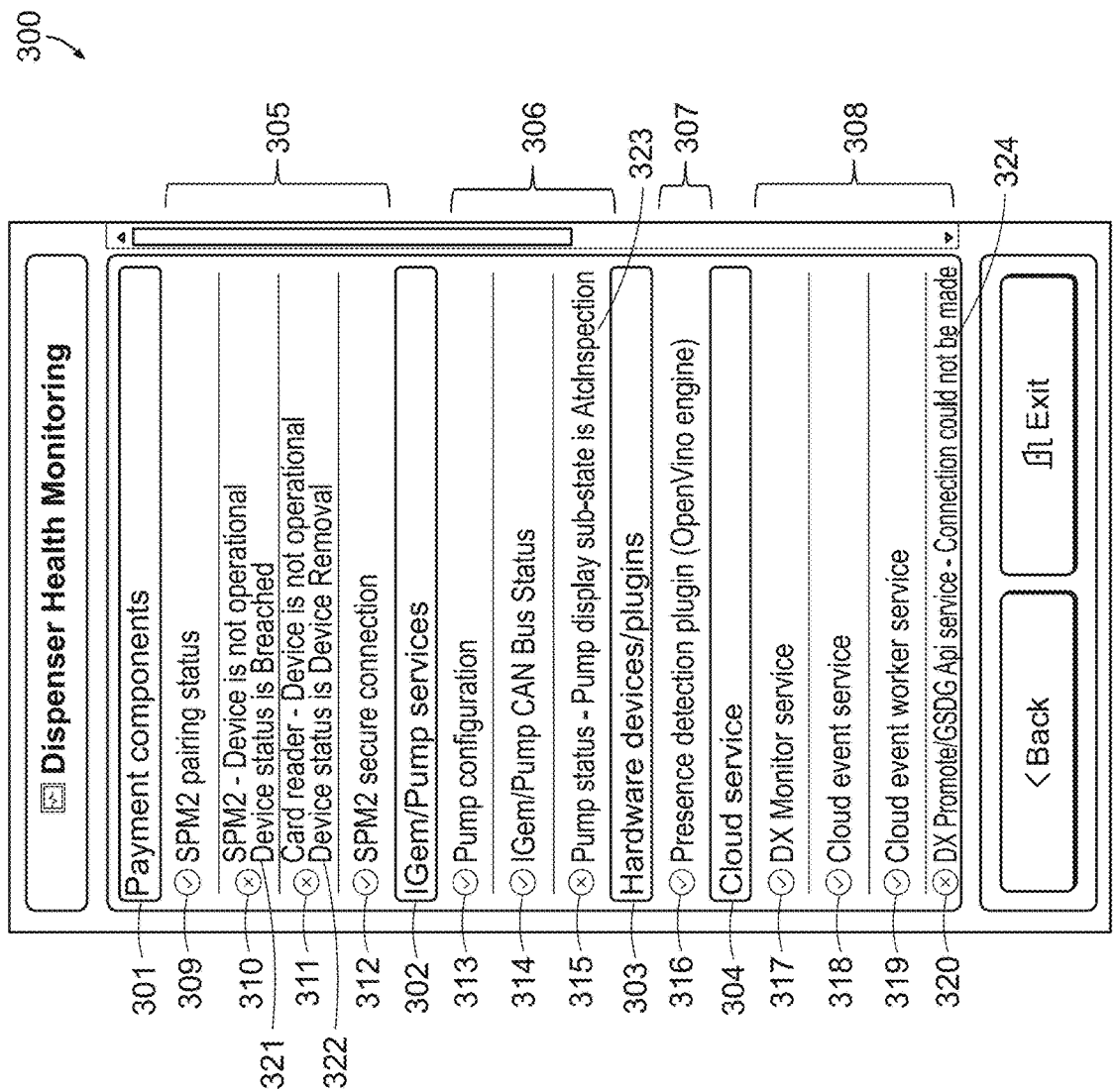
FIG. 3 is one implementation of an exemplary graphical user interface dashboard that is configured to provide real-time graphical indications of the operational status of functions of, components of, and/or services offered by a product dispenser.

As mentioned above, product dispensers, such as the first product dispenser 12a, can be configured in accordance with a particular hardware, software, and/or firmware configuration. In some embodiments, the configuration of a product dispenser can be graphically represented via a dashboard that is depicted on a graphical display of the product dispenser (e.g., display 112 of fuel dispenser 102, as illustrated in FIG. 2.) FIG. 3 illustrates aspects of an exemplary graphical user interface dashboard 300 that is configured to provide real-time graphical indications of the configuration of, and operational status of, functions of, components of, and/or services offered by a product dispenser (e.g., first product dispenser 12a, second product dispenser 12b, and/or fuel dispenser 102) and operationally managed by the configuration of the product dispenser. As shown in FIG. 3, in some embodiments, the graphical user interface dashboard 300 can include one or more headings, such as headings 301-304, that lists functions, components and/or service groups (e.g., Payment components, IGem/Pump services, Hardware devices/plugins, Cloud services, product dispenser modules, etc.). Provided underneath each of the headings are one or more graphical listings, such as those provided within listing groups 305-308, that visually depict the function(s), component(s), and/or service(s) that correspond to the component and/or service group(s) characterized by the listed heading 301-304.

In some embodiments, the dashboard 300 can include one or more status icons, such as status icons 309-320, that correspond to each function, component and/or service provided in each of listings within listing groups 305-308. The status icons 309-320 can indicate, in real-time, the configuration and/or operational status of that function, component and/or service. For example, status icons 309, 312-314, and 316-319 are in the form of a check mark indicating that the function/component/service corresponding to the status icon is operating and/or is configured correctly. Similarly, status icons 310-311, 315, and 320 are in the form of an "x", which indicates the function/component/service corresponding to the status icon is not operating and/or configured correctly. In some implementations, the status icon may take the form of a "?" indicating that the configuration/operating status of the function/component/service corresponding to the status icon is unknown. The graphical user interface dashboard 300 includes a graphical message, located within the function icon, providing additional information about the function, component and/or service and/or the configuration/operational status of the function, component and/or service. For example, as shown in FIG. 3, status icon 310 is in the form of an "x", which indicates that the SPM2 payment component is not operating properly. To provide some explanation of the technical issue that may be causing the SPM2 payment component to not operate or be configured properly, the graphical user interface dashboard 300 includes a graphical message 321 indicating that the SPM2 payment component is not operational and that the status of the SPM2 device is "Breached." Similar forms of additional information, such as graphical messages 322-324, can be provided for each of the listings within the listing groups 305-308.

Figure 4A:
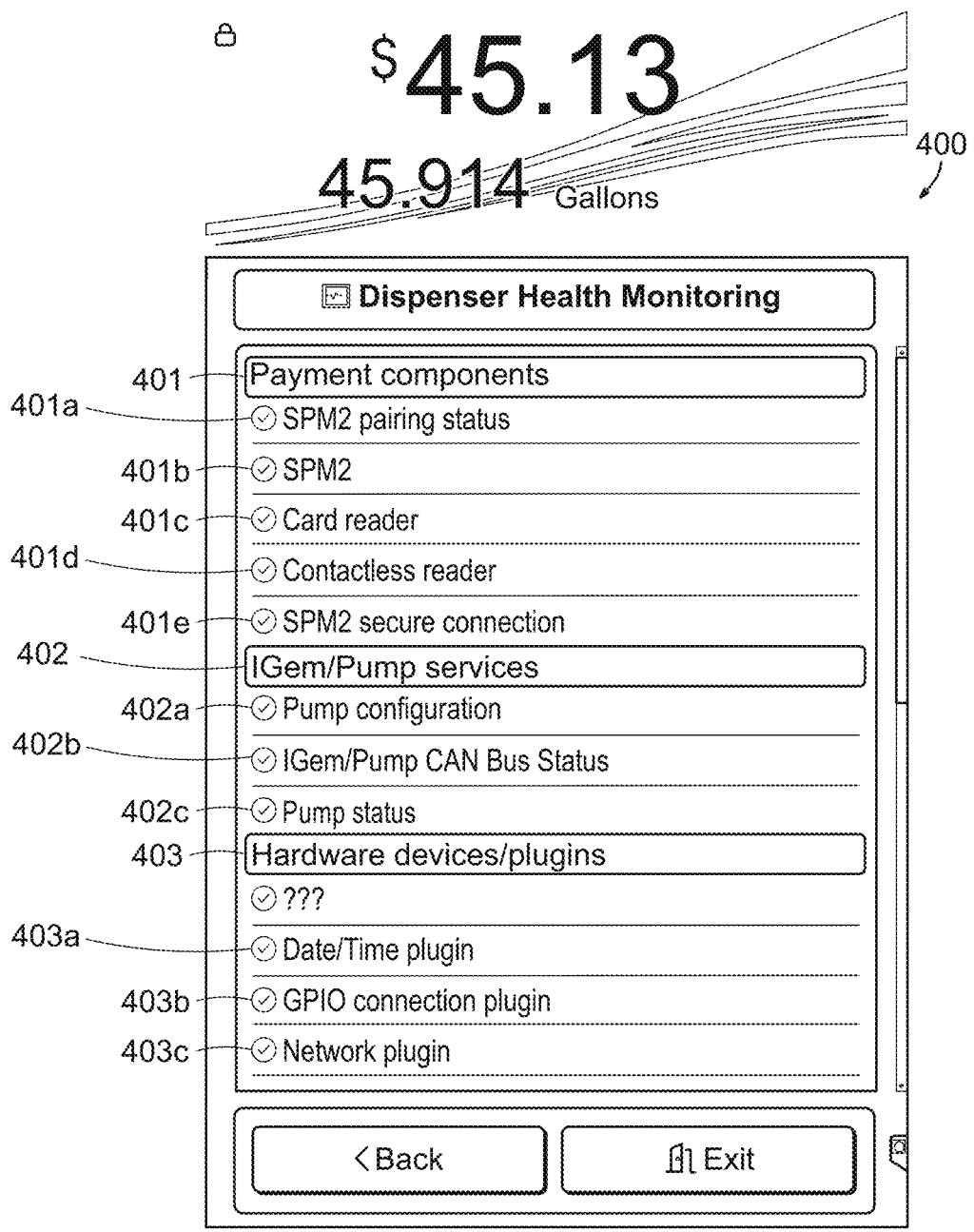
FIG. 4A is a first view of another implementation of an exemplary graphical user interface dashboard that is configured to provide real-time graphical indications of the operational status of functions of, components of, and/or services offered by a product dispenser.
Figure 4B:
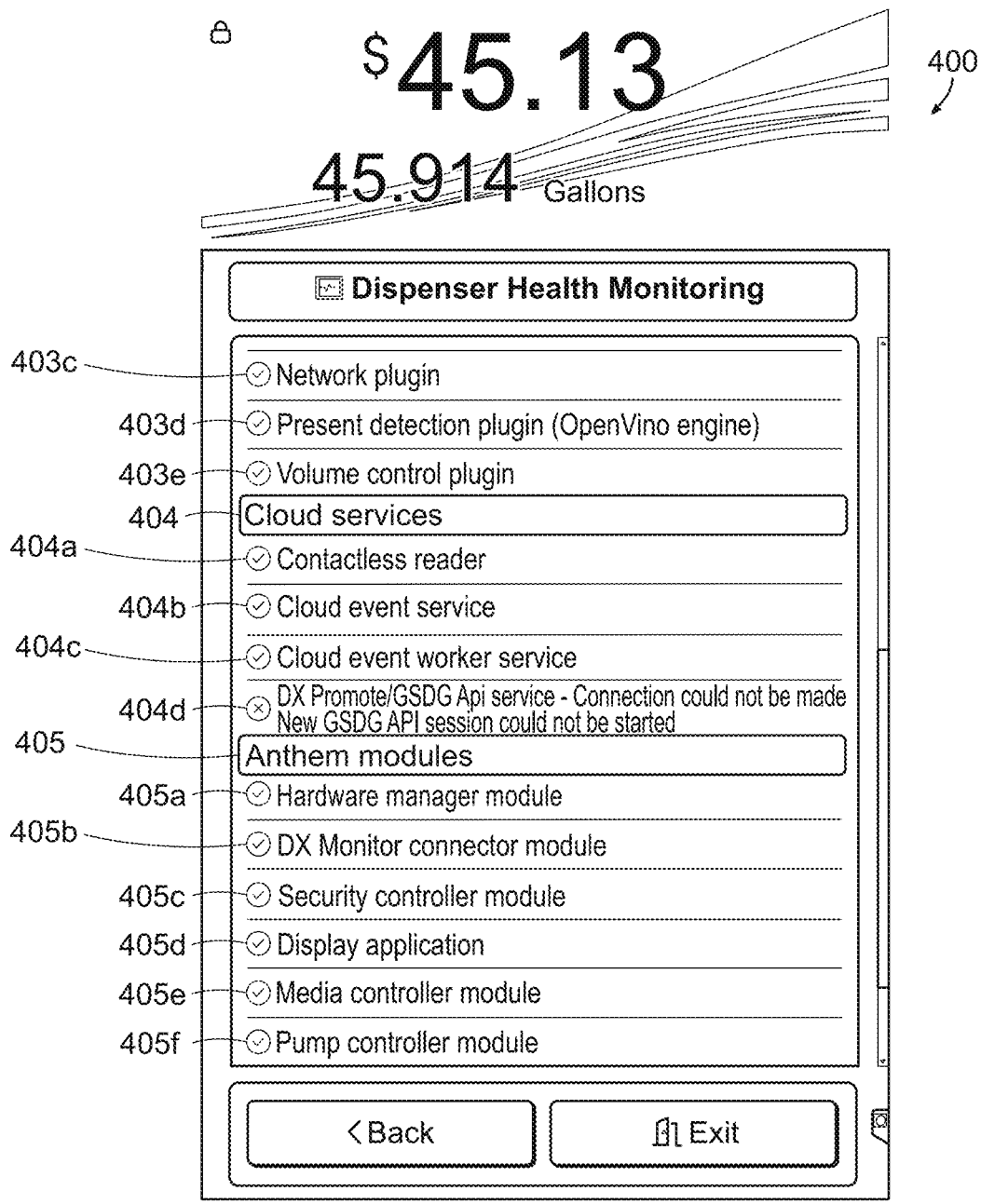
FIG. 4B is a second view of the exemplary graphical user interface dashboard of FIG. 4A.
Figure 4C:
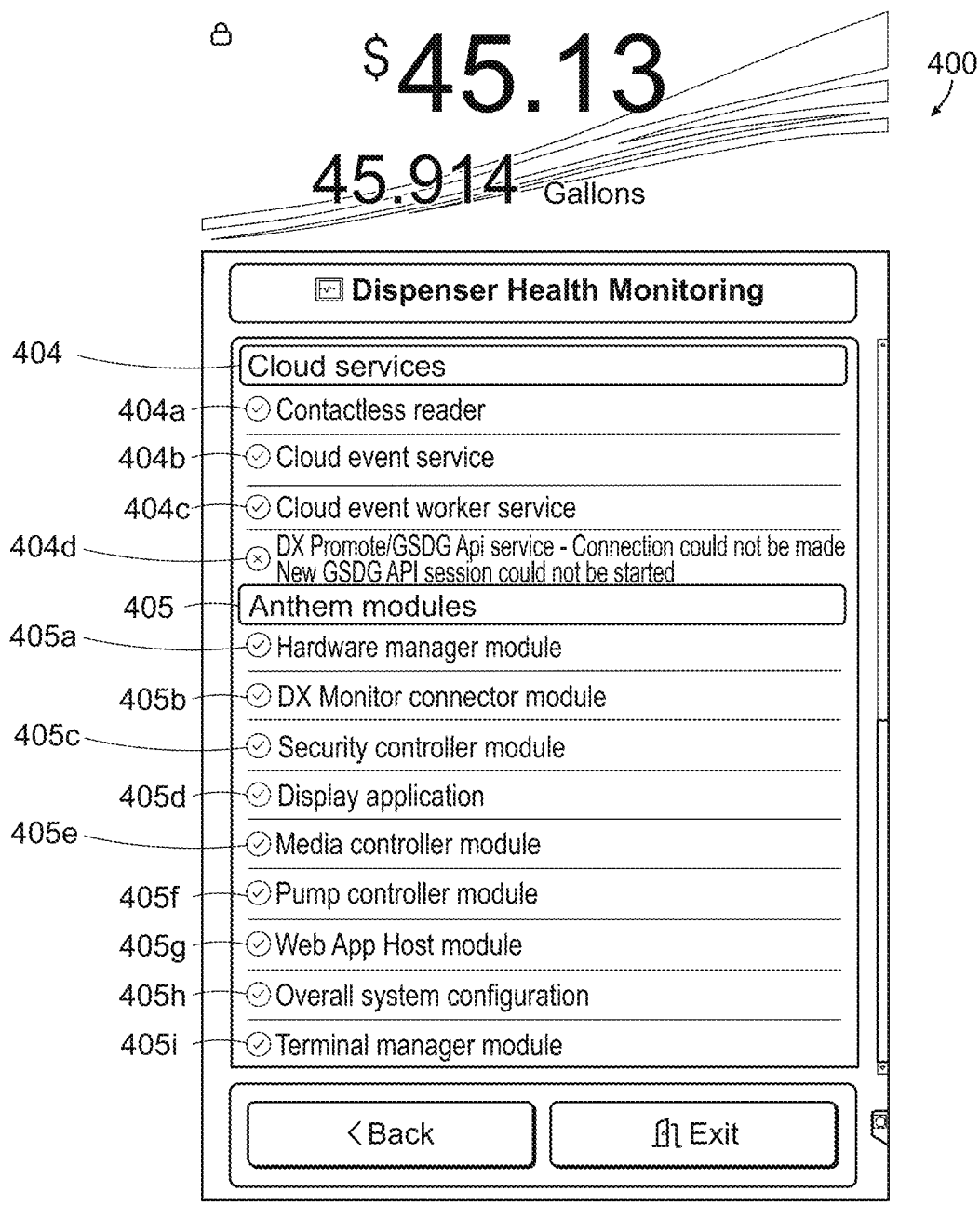
FIG. 4C is a third view of the exemplary graphical user interface dashboard of FIG. 4A.

As referenced above, the dashboard can include graphical indications of the configuration of functions of, components of, and/or services offered by the product dispenser (e.g., first product dispenser 12a and/or first product dispenser 12b) and operationally managed by the configuration of the product dispenser. FIGS. 4A-4C illustrate views of an exemplary graphical user interface dashboard 400 featuring this functionality. In some embodiments, the dashboard 400 can incorporate one or more aspects of the graphical user interface 300 described above with respect to FIG. 3.

As shown, and similar to graphical user interface dashboard 300, the dashboard 400 can include one or more headings, such as headings 401-405, that graphically characterize functions, components and/or service groups that are offered by the product dispenser and/or that are managed by the configuration of the product dispenser (e.g., first product dispenser 12a and/or first product dispenser 12b). Indeed, the configuration of the product dispenser can characterize the organization and/or operation of the hardware, software, and/or firmware required to operate some or all of functions, components, and/or service groups characterized by the dashboard 400 and described in detail below.

For example, underneath the Payment components heading 401, the dashboard 400 includes a graphical listing 401a that graphically characterizes the configuration/operational status of the Secure payment module (SPM) pairing operation. Thus, the listing 401a can provide an indication of whether the SPM is correctly/securely communicating and whether the SPM is properly configured. As another example, the dashboard 400 includes a graphical listing 401b that graphically characterizes the configuration/operational status of the SPM's device operation. Thus, the listing 401b can provide an indication of whether the SPM is operating without error conditions. As yet another example, the dashboard 400 includes a graphical listing 401c that graphically characterizes the configuration/operational status of the product dispenser's card reader device. Thus, the listing 401c can provide an indication of whether the card reader is online and/or operating without reporting any error conditions. As yet another example, the dashboard 400 includes a graphical listing 401d that graphically characterizes the configuration/operational status of the product dispenser's contactless reader device. Thus, the listing 401d can provide an indication of whether the contactless reader is online and/or operating without reporting any error conditions. And, as yet another example, the dashboard 400 includes a graphical listing 401e that characterizes the configuration/operational status of the security of the SPM's connection. Thus the listing 401e can provide an indication of whether the SPM2 is operating with a secure connection.

As another example, and with continued reference to FIG. 4A, underneath the IGem/Pump services heading 401, the dashboard 400 includes a graphical listing 402a that graphically characterizes the configuration of a pump configured to dispense fuel. Thus, the listing 402a can provide an indication of whether the dispenser configuration is complete (e.g., no missing product assignments to digital push to start buttons, octane assignments have been made and prices have assigned, etc.). As another example, the dashboard 400 includes a graphical listing 402b that graphically characterizes the configuration/operational status of the IGem/Pump CAN Bus. Thus, the listing 402b can provide an indication of whether the CAN Bus is reporting any errors. As another example, the dashboard 400 includes a graphical listing 402c that characterizes the operational status of the pump described above.

As another example, and with reference to FIGS. 4A-4B, underneath the Hardware devices/plugins heading 403, the dashboard 400 includes graphical listings 403a-403e which graphically characterizes the operational status of one or more plugins configured to operate on the product dispenser. The plugins to which each of these listings 403a-403e correspond (e.g., date/time plugin 403a, General purpose input/output (GIPO) connection plugin 403b, network plugin 403c, presence detection plugin 403d, and volume control plugin 403e) interface with computing hardware (e.g., memory, processor, etc.) are configured to manage the operation of date/time calculation, input/outputs, network connectivity/configuration, customer presence detection, and volume control respectively. Thus, the listings 403a-403e provide an indication of whether each of these plugins are operating correctly.

As yet another example, and with reference to FIGS. 4B and 4C, underneath the Cloud services heading 404, the dashboard 400 includes graphical listings 404a-404d which graphically characterize the operational status of various cloud services, such as those present on remote server 16, with which the product dispenser is configured to communicate. The services to which each of these listings 404a-404d correspond (e.g., remote server (e.g., DX Monitor) service 404a, Cloud event service 404b, cloud event worker service 404c, DX Promote/GSDG API service 404d) are configured to communicate with the product dispenser to facilitate or enable various aspects of product dispenser functionality. Thus, the listings 403a-403e provide an indication of whether the connections to each of these services are properly configured and properly receiving information characterizing the operating status of the product dispenser without errors.

And, as yet another example, and with reference to FIGS. 4B and 4C, underneath the Anthem modules heading 405, the dashboard 400 includes graphical listings 405a-405i which graphically characterize various modules of the operating platform of the product dispenser (e.g., the Anthem UX™ platform available from Dover Fueling Solutions of Austin, TX). The modules to which each of these listings 405a-405i correspond (hardware manager module 405a, DX Monitor connector module 405b, Security module controller 405c, display application 405d, media controller module 405e, pump controller module 405f, web app host module 405g, overall system configuration monitor 405h, and terminal manager module 405i) are configured to operate one or more aspects of the operating platform of the product dispenser. Thus, the listings 405a-405i provide an indication of whether each of these modules are properly configured.

The graphical user interface dashboards described above provide several advantages. For example, as software-level error catching is built in to each of the modules/functions described above, the graphical user interface dashboard provides a centralized user interface that permits more efficient troubleshooting of errors in the configuration of the product dispenser operating system platform of the product dispenser on which the platform is operating. In some applications of dispenser error monitoring, the software-level error catching built into each of the modules/functions can be logged to a compilation of unwieldy and difficult-to-process log files that are difficult to evaluate when troubleshooting platform and/or dispenser issues. As such, the graphical user interface dashboards described herein provide a more efficient technique for presenting error data as compared to prior techniques.

In some implementations, the configuration of a first product dispenser, such as first product dispenser 12a that is fully operating correctly (e.g., all of the functions, components and/or service groups that are offered by the product dispenser and/or that are managed by the configuration of the product dispenser are operating/configured correctly and are indicated as such in the dashboard(s) described above, etc.) may be replicated on another product dispenser at the dispensing station, such as second product dispenser 12*b*. For example, configuration data characterizing a payment terminal configuration of the first product dispenser, a configuration of the first product dispenser's operating platform, and the first product dispenser's networking settings can be copied and transmitted to the second product dispenser at the dispensing station via the local site network (e.g., site local server 14) to which the first product dispenser and the second product dispenser are operably coupled. In addition, graphical data, such as graphical branding material, characterizing graphical content that is displayed on the first product dispenser may also be copied and transmitted to the second product dispenser directly via communication link 18 or through the site local server 14 (over communication link 20 and communication link 22.)

As explained above, there may be additional product dispensers at a dispensing station beyond the first product dispenser 12*a* and the second product dispenser 12*b*. As such, in some embodiments, the configuration data and/or the graphical data may be transmitted from the first product dispenser 12*a* to additional recipient product dispensers beyond second product dispenser 12*b* via direct communication links established between the first product dispenser and each additional recipient product dispenser. And, in some embodiments, the configuration data and/or the graphical data may be transmitted to the site local server 14, and the site local server 14 may transmit the configuration and/or the graphical data to a third product dispenser via a communication link established between the site local server 14 and the third product dispenser, to a fourth product dispenser via a communication link established between the site local server 14 and the third product dispenser, and to as many product dispensers that are at the dispensing station and needing to be configured in accordance with the configuration of the first product dispenser.

Once the configuration data and/or the graphical data is received by the recipient product dispenser (e.g., the second product dispenser 12*b*, etc.), a processor of the recipient product dispenser can execute instructions that cause the recipient product dispenser to be configured in accordance with the configurations characterized by the received configuration data and to display the graphical content characterized by the received graphical data. In some implementations, the processor can execute these instructions in response to a user input on a graphical display of the recipient product dispenser requesting that the recipient product dispenser be configured in accordance with the configurations characterized by the received configuration data and display the graphical content characterized by the received graphical data. In some embodiments, the processor can execute these instructions in response to the receipt, from the site local server, of data characterizing a command to cause the processor of the recipient product dispenser to execute the instructions.

The ability to provide an optimized configuration of a product dispenser at a dispensing station, either directly or via site local server 14, to other product dispensers at the dispensing station provides several technical advantages. With this functionality an optimized, "healthy" product dispenser configuration that is optimized for the dispensing station can be directly imported to other product dispensers at the dispensing station lacking that configuration without the need for off-site connectivity. Such functionality can be particularly useful at dispensing stations installed at remote locations with little-to-no offsite connectivity with offsite networks, such as the Internet or a wide area network, where it is not possible to obtain such optimized product dispenser configurations from remote servers (such as remote server 16).

In some embodiments, in addition to or in place of the above-described functionality, the command received from the site local server (e.g., site local server 14) can be received from a remote server (e.g., remote server 16) in operable communication with the site local server 14, such that an operator of the dispensing station can remotely cause the configuration of the recipient product dispenser (e.g., second product dispenser 12*b*) in accordance with the configurations characterized by the received configuration data and display the graphical content characterized by the received graphical data.

In some implementations, transmission instructions causing the transmission of the configuration data and/or the graphical data from the originating product dispenser (e.g., first product dispenser 12*a*) to the site local server (e.g., site local server 14) in response to a user input on a graphical display of the originating product dispenser requesting that the recipient product dispenser(s) (e.g., second product dispenser 12*b*) be configured in accordance with the configurations characterized by the received configuration data and display the graphical content characterized by the received graphical data.

In some implementations, the processor of the originating product dispenser (e.g., first product dispenser 12*b*) can execute these transmission instructions in response to the receipt, from the site local server 14, of data characterizing a command to cause the processor of the originating product dispenser to execute the transmission instructions. In some implementations, the command received from the site local server (e.g., site local server 14) can be received from a remote server (e.g., remote server 16) in operable communication with the site local server, such that an operator of the dispensing station can remotely cause the transmission of the configuration data and/or the graphical data to the recipient product dispenser(s).

FIGS. 5A-5G illustrate a series of views of a graphical user interface used in an exemplary process for applying the configuration and/or graphical branding materials of the first product dispenser 12*a* to the second product dispenser 12*b* having a pre-existing configuration previously installed thereon. While the process is described with reference to the graphical user interfaces illustrated in FIGS. 5A-5G, one of ordinary skill in the art would understand that the configuration application process can occur without the use of the graphical user interface shown and described herein.

Figure 5A:
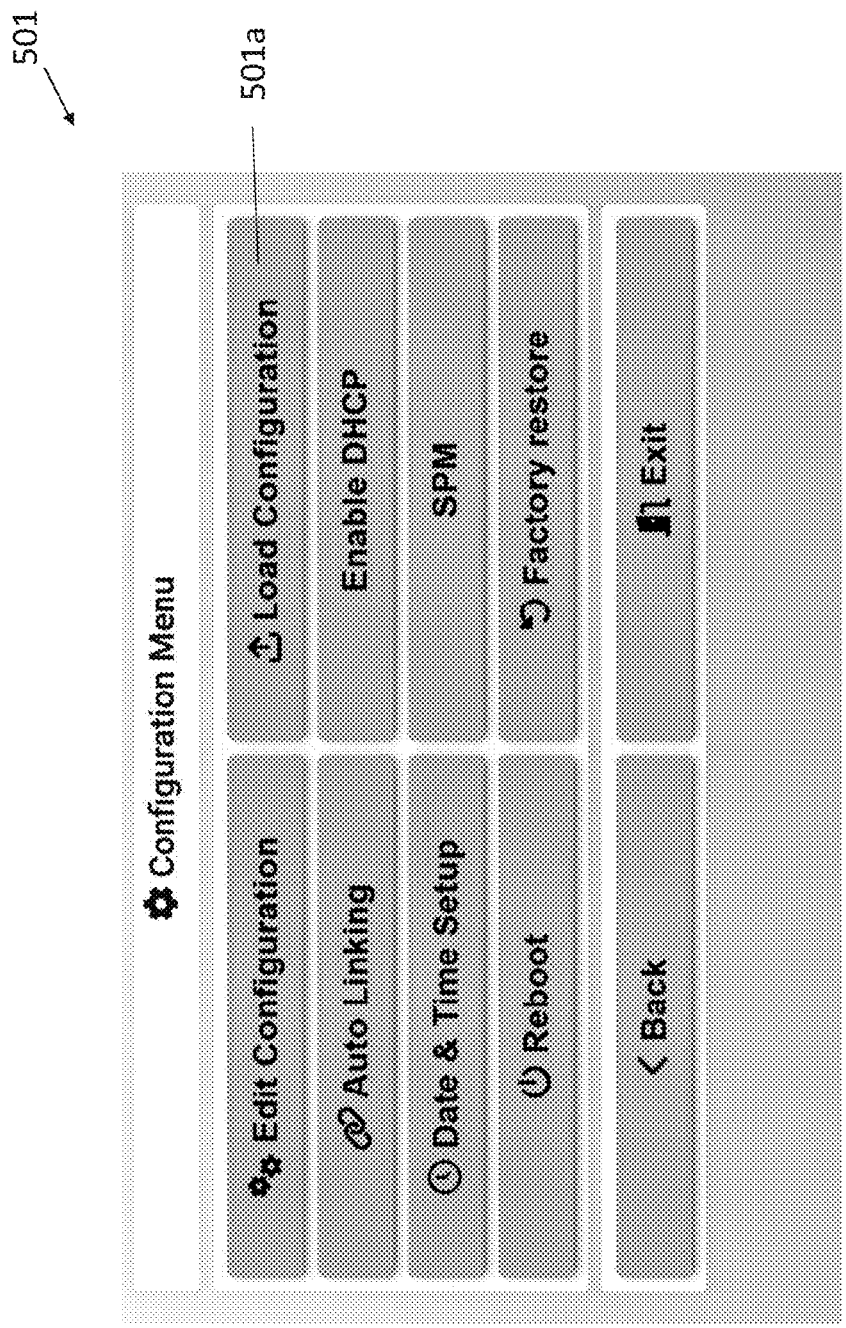
FIG. 5A is a first view of an exemplary graphical user interface used in an exemplary process for applying the configuration and/or branding materials of a first product dispenser to a second product dispenser located at the same dispensing station as the first product dispenser and having a pre-existing configuration previously installed thereon.

FIG. 5A illustrates an exemplary graphical user interface view 501 depicted on a display of a recipient product dispenser, such as second product dispenser 12*b*, when an operator wishes to begin the process of applying the configuration of the first product dispenser 12*a* to the second product dispenser 12*b* having a pre-existing configuration previously installed thereon. As shown in FIG. 5A, the graphical user interface 501 includes a configuration menu featuring several touch-screen buttons for the operator of the second product dispenser 12*b* to select. To initialize the applying the configuration of the first product dispenser 12*a* to the second product dispenser 12*b*, an operator can select the "Load Configuration" touch screen button 501*a*.

Figure 5B:
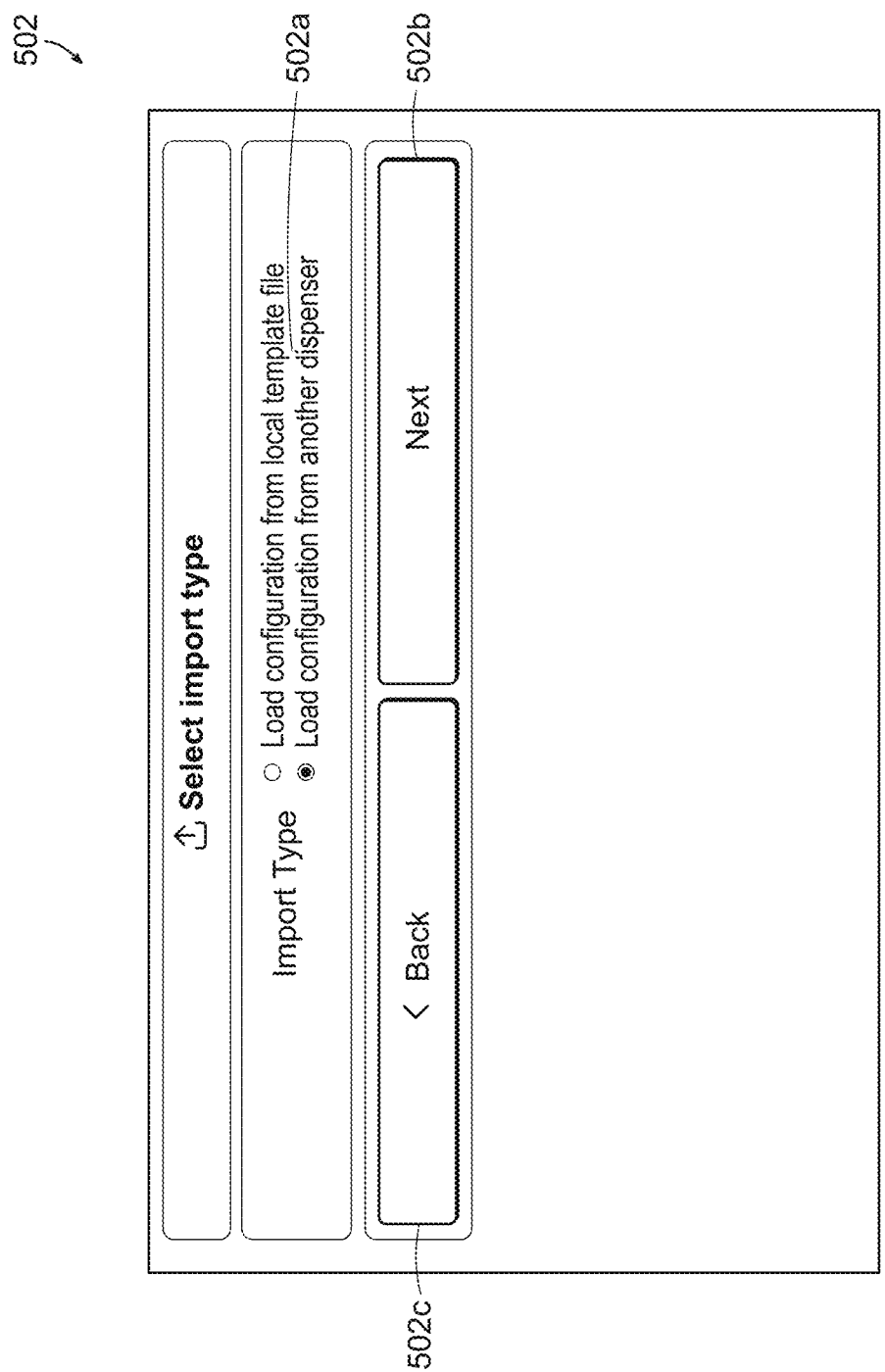
FIG. 5B is a second view of the exemplary graphical user interface dashboard of FIG. 5A.

FIG. 5B illustrates an exemplary graphical user interface view 502 depicted on a display of the recipient product dispenser when an operator has selected the "Load Configuration" touch-screen button 501*a* on the configuration menu illustrated in FIG. 5A. As shown in FIG. 5B, the operator is provided an option dialog 502*a* for selecting whether to load the optimized configuration from a local template file or to load the optimized configuration directly from another dispenser located at the fueling station (e.g., the first product dispenser 12a) via a communication link, such as communication link 18. The operator can confirm that selection by selecting the "Next" touch-screen button 502b, and the operator can return to the configuration menu illustrated in FIG. 6A by selecting the "Back" touch-screen button 502c.

Figure 5C:
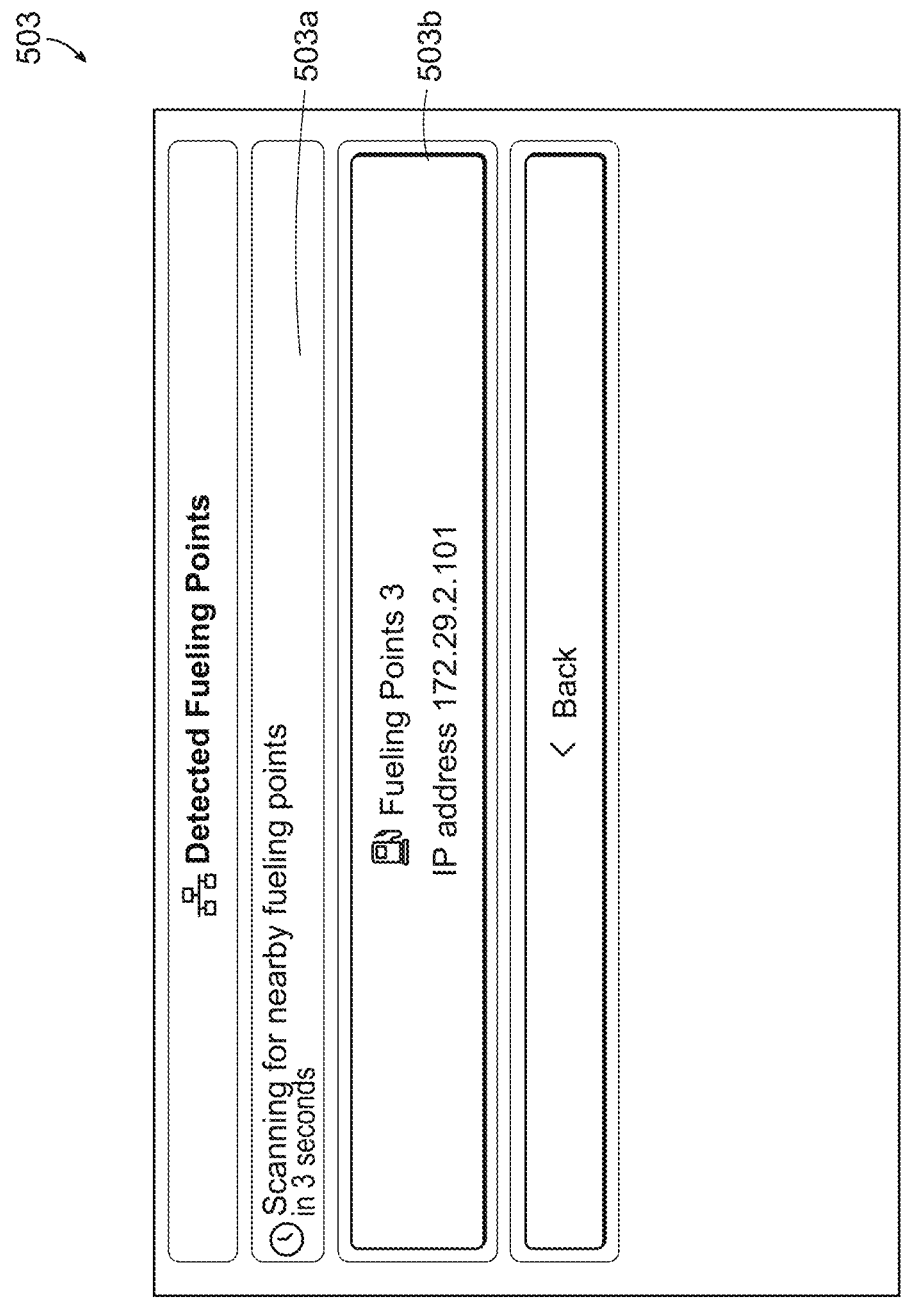
FIG. 5C is a third view of the exemplary graphical user interface dashboard of FIG. 5A.

FIG. 5C illustrates an exemplary graphical user interface view 503 depicted on a display of the recipient product dispenser when the "Load configuration from another dispenser" option has been selected at option dialog 502a and by the operator pressing the "Next" touch-screen button 502b as illustrated in FIG. 5B. After the "Next" touch-screen button has been selected, the interface displays a status indicator 503a indicating that the fuel dispenser is scanning for nearby dispensing points. The interface can provide, as a touch-screen button 503b, a graphical depiction of a product dispenser (e.g, a "fueling point" having the desired configuration and/or branding, such as first product dispenser 12a) that is detected as having a configuration which can be applied to the second product dispenser 12b.

Figure 5D:
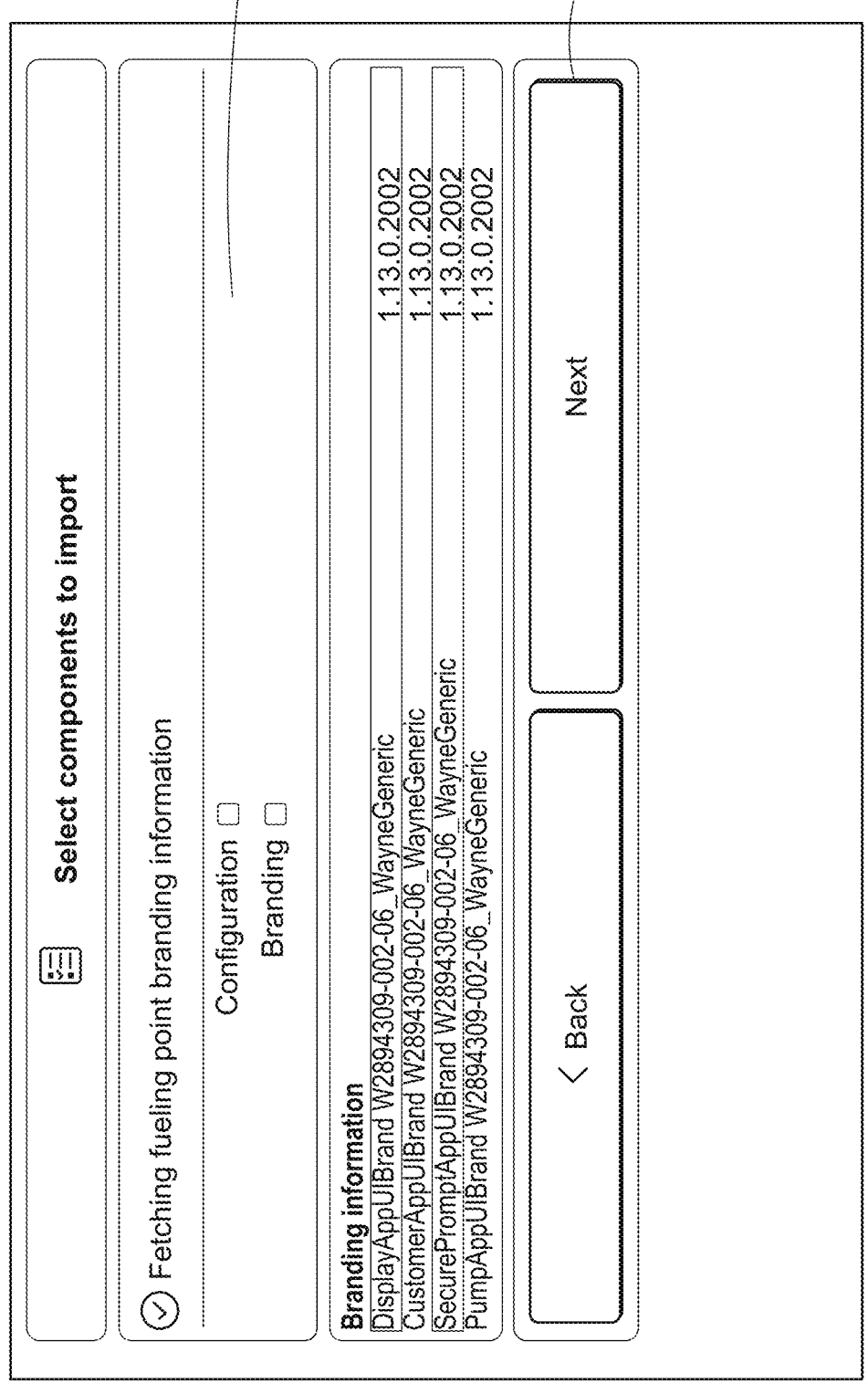
FIG. 5D is a fourth view of the exemplary graphical user interface dashboard of FIG. 5A.
Figure 5E:
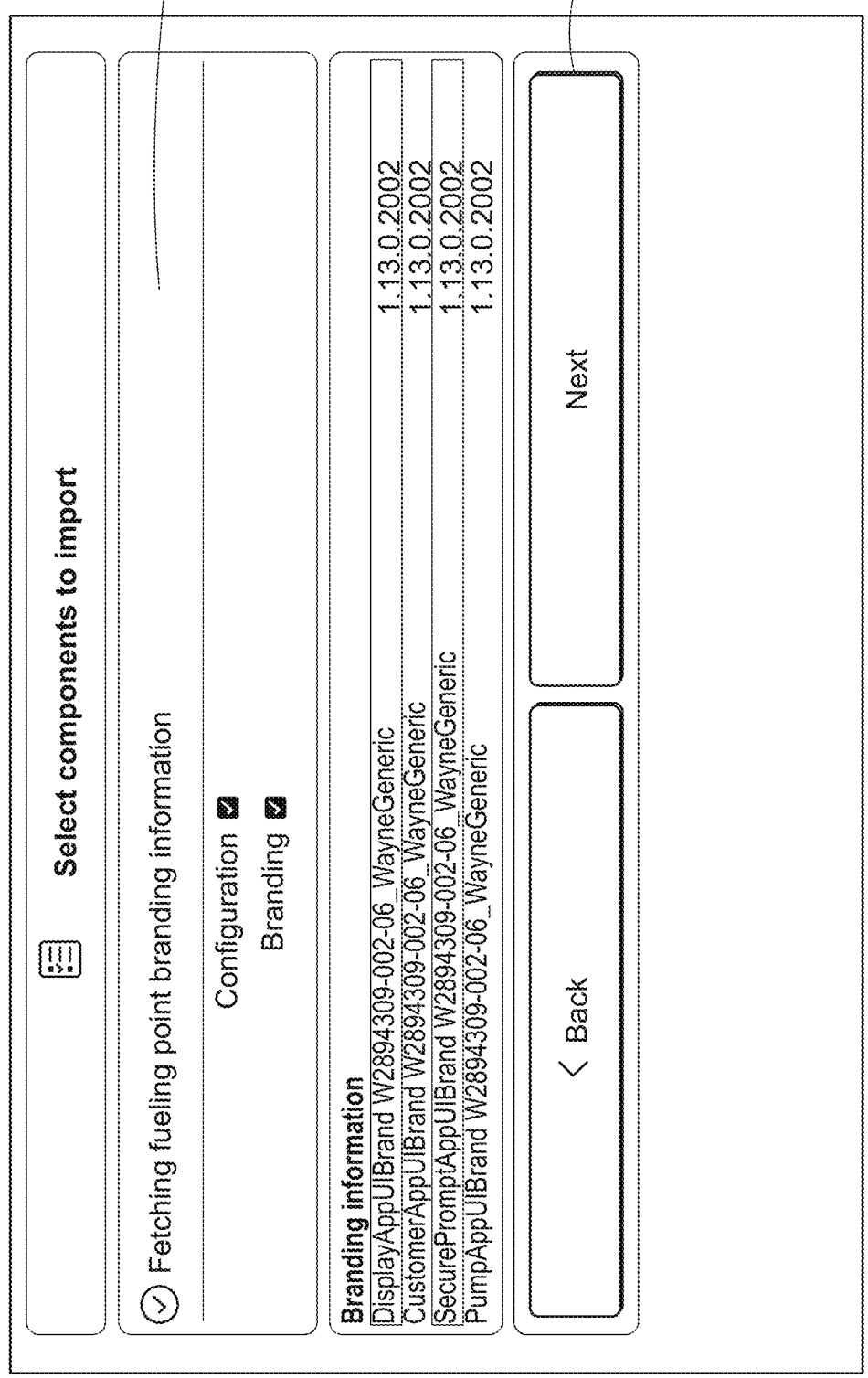
FIG. 5E is a fifth view of the exemplary graphical user interface dashboard of FIG. 5A.

FIGS. 5D and 5E illustrate exemplary graphical user interface views 504 depicted on a display of the recipient product dispenser after the operator has selected the detected product dispenser, such as first product dispenser 12a, via button 503b. As shown, the graphical user interface provides the operator with the ability to select whether the configuration data characterizing the configuration of the first product dispenser 12a is imported, whether the graphical data characterizing the graphical branding materials used in the first product dispenser 12a are imported, or both. As shown, the operator can make one or both of these selections via selection dialog 504a. For example, as shown in FIG. 5E, both the configuration data and the branding materials data are used and confirm the selection by pressing a "Next" touch-screen button 504b included in the graphical user interface, which causes the selected configuration and/or branding materials to be downloaded to the second product dispenser 12b.

Figure 5F:
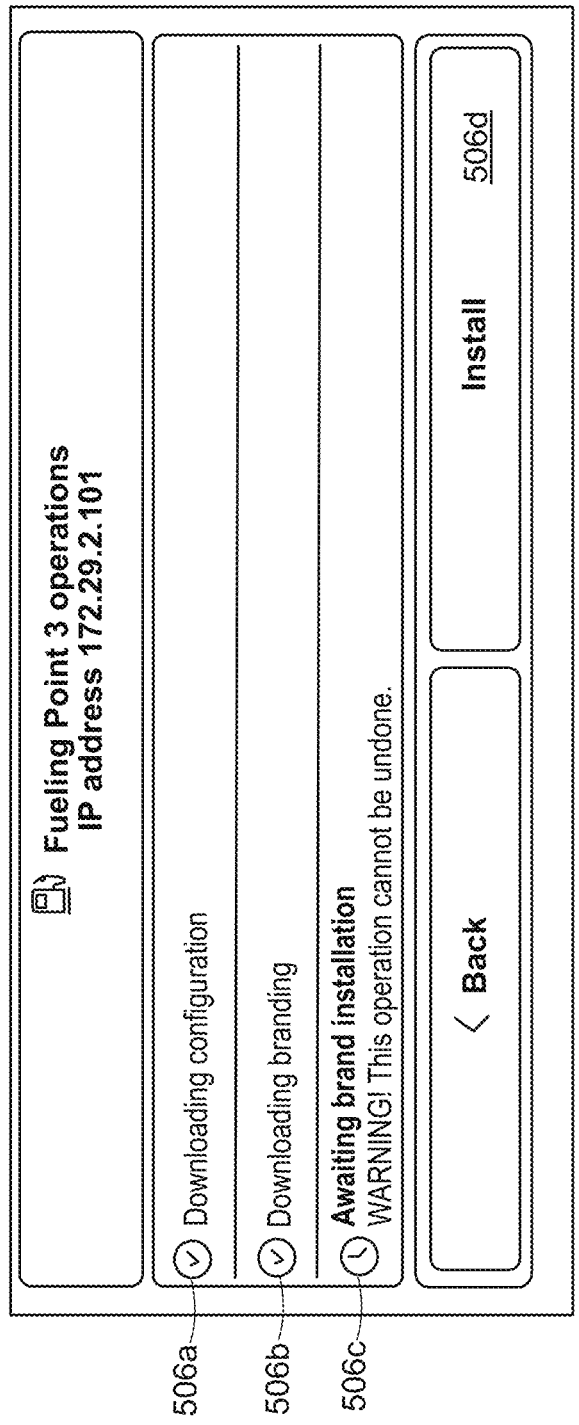
FIG. 5F is a sixth view of the exemplary graphical user interface dashboard of FIG. 5A.

In some embodiments, the graphical user interface can indicate whether the configuration data and/or the graphical data has been successfully downloaded to the second fuel dispenser 12b. For example, FIG. 5F illustrates an exemplary graphical user interface view 506 depicted on a display of the fuel dispenser when the receipt of the configuration data of the first product dispenser 12a and the graphical data of the first product dispenser 12a, which characterizes graphical branding materials, has been successful. As shown, the status indicators 506a, 506b which are graphically depicted as a check mark, indicate that download of the configuration data and the branding materials data was successful. In addition, the graphical user interface includes a status indicator 506c, in the form of a clock, which indicates that the installation of the branding materials data onto the second product dispenser 12b is on hold. The operator can then choose to install the configuration data and the branding materials data downloaded from the first product dispenser 12a by selecting the Install button 506d.

Figure 5G:
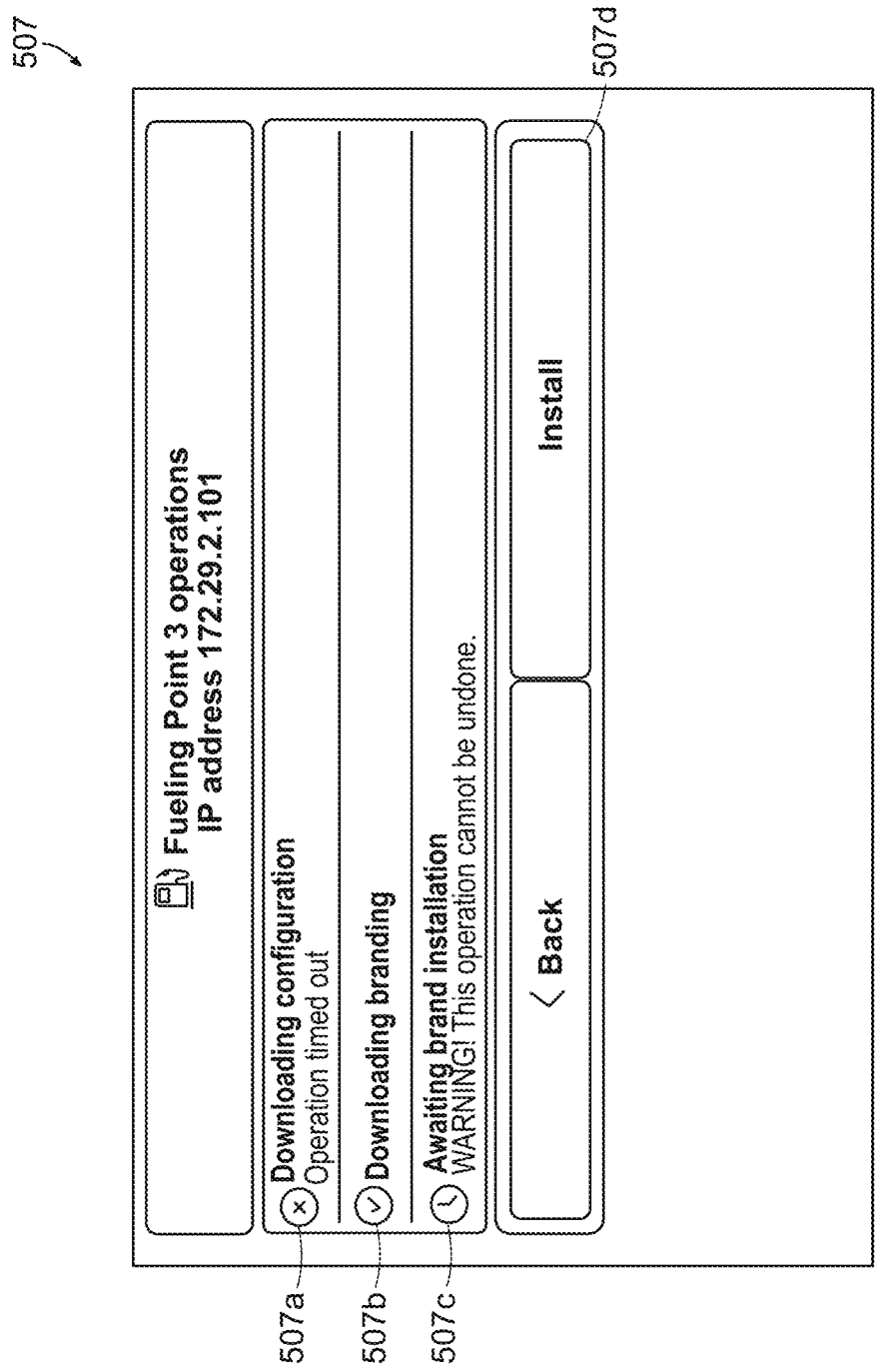
FIG. 5G is a seventh view of the exemplary graphical user interface dashboard of FIG. 5A.

Additionally, in some embodiments, the graphical user interface can indicate whether the configuration and/or the graphical data was not successfully downloaded to the second product dispenser 12b. For example, FIG. 5G illustrates an exemplary graphical user interface view 507 depicted on a display of the second product dispenser 12b when the receipt of the configuration data has been unsuccessful due to a timeout error but the receipt of the graphical data characterizing the graphical branding materials has been successful. As shown, the graphical user interface also includes a status indicator 507a, in the form of a graphical depiction of an "x", that indicates that the download of the configuration data was unsuccessful. As discussed above with respect to FIG. 5F, the graphical user interface also includes a status indicator 507b, in the form of a graphical depiction of a check mark, which indicates that the graphical data was successfully downloaded to the second product dispenser 12b. In addition, the graphical interface includes a status indicator 507c, in the form of a clock, which indicates that the installation of the branding materials data onto the second product dispenser 12b is on hold. The operator can then choose to install the configuration data and the branding materials data downloaded from the first product dispenser 12a by selecting the Install button 507d.

In some embodiments, the configuration and/or branding materials of the first product dispenser 12a can be applied to another product dispenser, such as second product dispenser 12b, in the instance where the second product dispenser lacks a pre-existing configuration previously installed thereon. FIGS. 6A-6J illustrate a series of graphical user interfaces used in an exemplary process for applying the configuration and/or branding materials of the first product dispenser 12a to the second product dispenser 12b having a pre-existing configuration previously installed thereon.

Figure 6A:
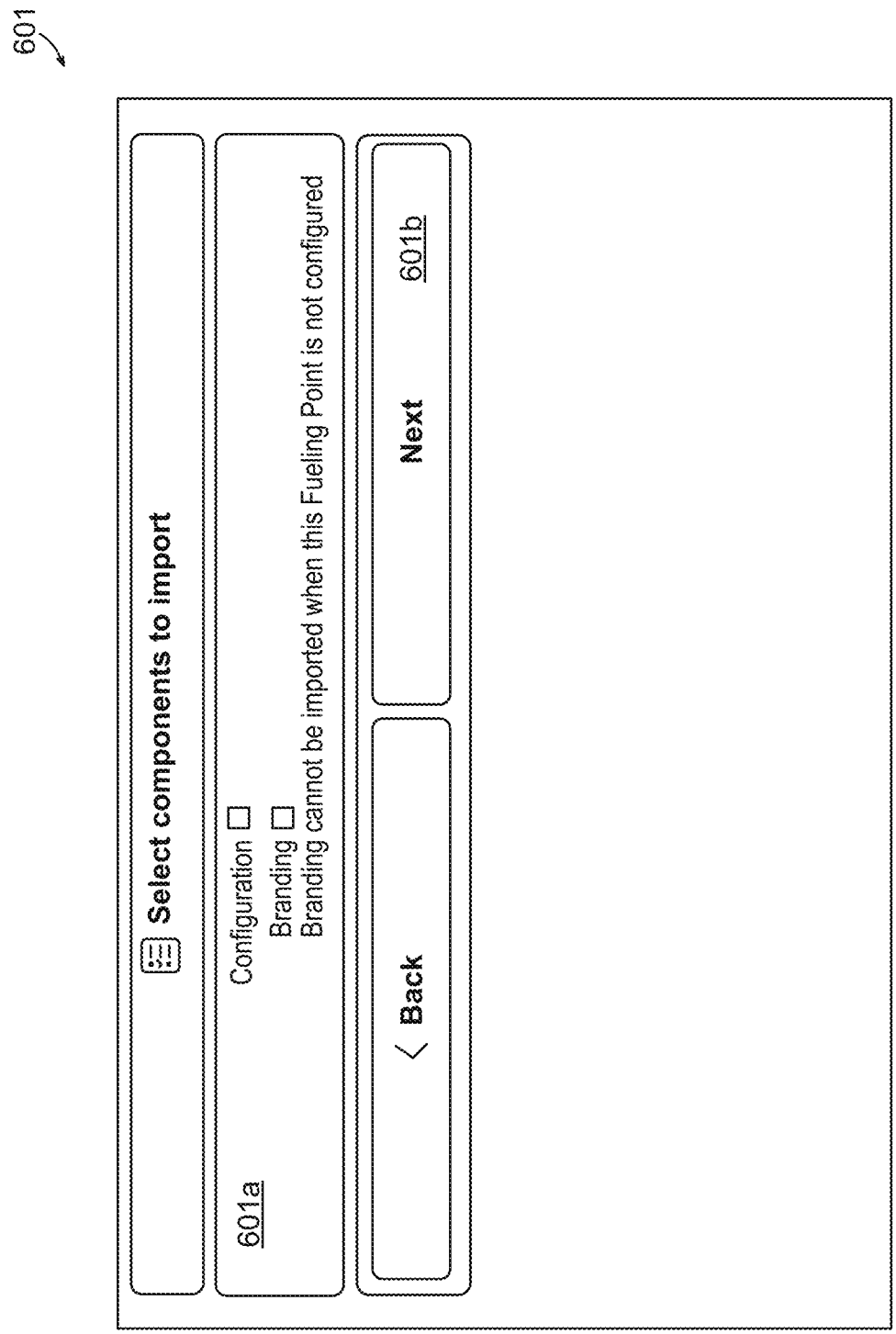
FIG. 6A is a first view of an exemplary graphical user interface used in an exemplary process for applying the configuration and/or branding materials of a first product dispenser to a second product dispenser located at the same dispensing station as the first product dispenser and lacking a pre-existing configuration previously installed thereon.

FIG. 6A, illustrates an exemplary graphical user interface view 601 depicted on a display of a recipient product dispenser, such as second product dispenser 12b, without a pre-existing configuration or branding and when configuration is to be initialized. As shown, in this case, an operator cannot import branding material without the fuel dispenser having a pre-existing configuration, and as such the branding option is unavailable for selection via a selection dialog 601a. Thus, the operator can only select to import a configuration from an originating product dispenser (e.g., first product dispenser 12a) via interacting with selection dialog 601a and pressing the "Next" touch-screen button 601b.

Figure 6B:
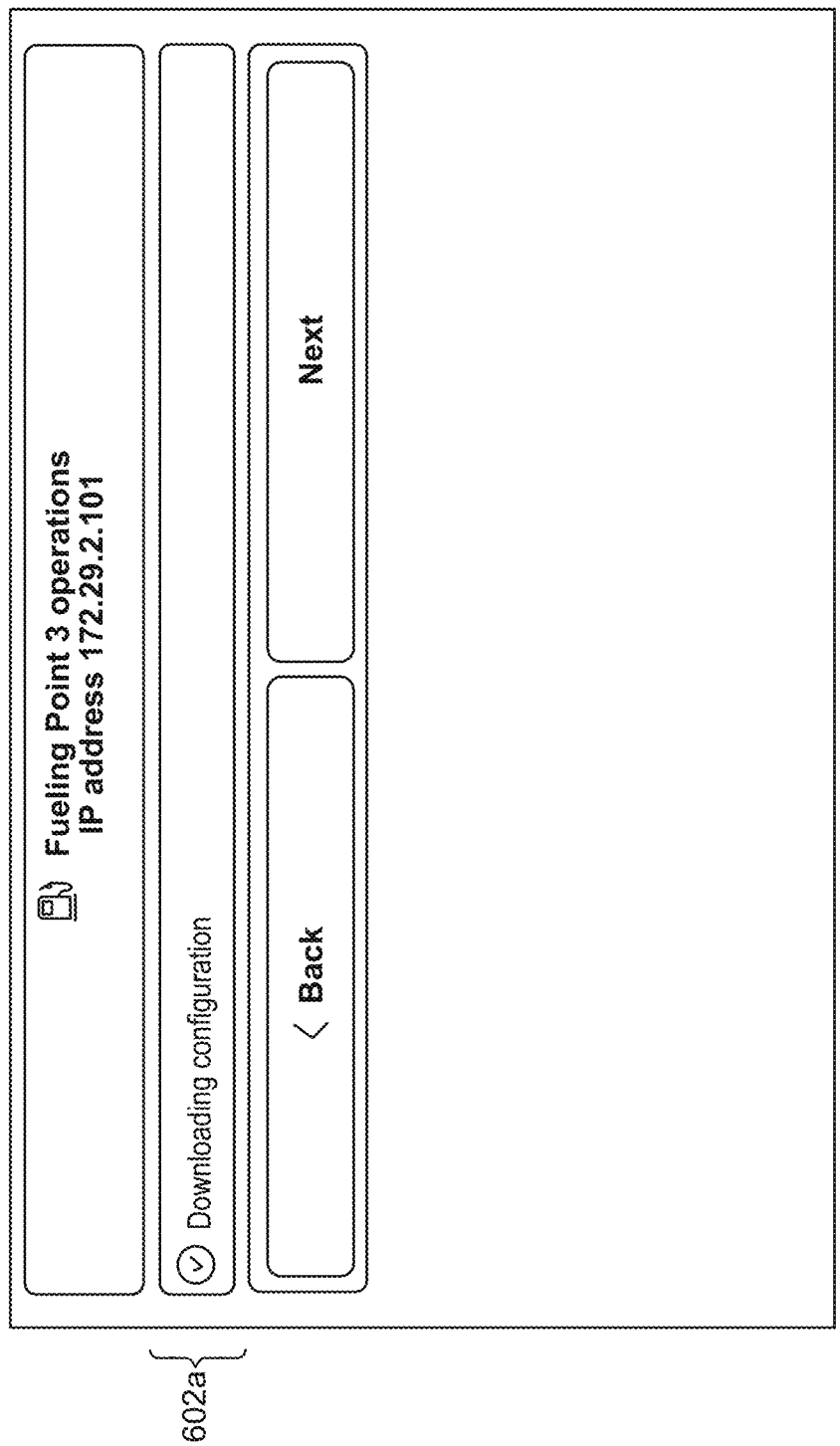
FIG. 6B is a second view of the exemplary graphical user interface dashboard of FIG. 6A.
Figure 6C:
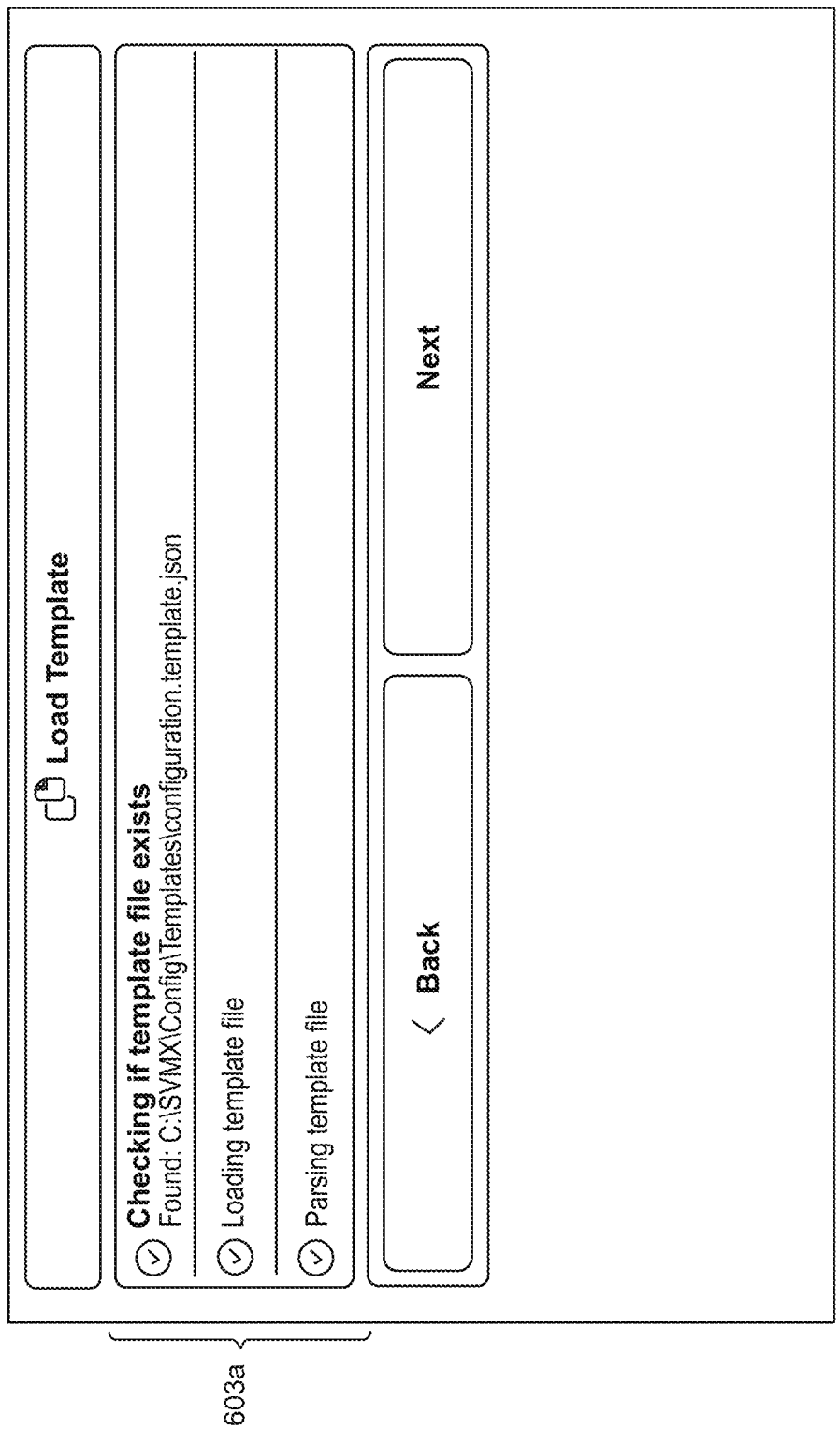
FIG. 6C is a third view of the exemplary graphical user interface dashboard of FIG. 6A.

FIGS. 6B and 6C illustrate exemplary graphical user interface views 602 and 603 of processes occurring on the recipient product dispenser when the operator has chosen to import a configuration from the originating product dispenser by selecting the "Next" touch-screen button shown in FIG. 6A above. As illustrated by the graphical indicators 602a and 603a, in the process of the configuration is downloaded from the first product dispenser 12a and one or more configuration template files are loaded.

Figure 6D:
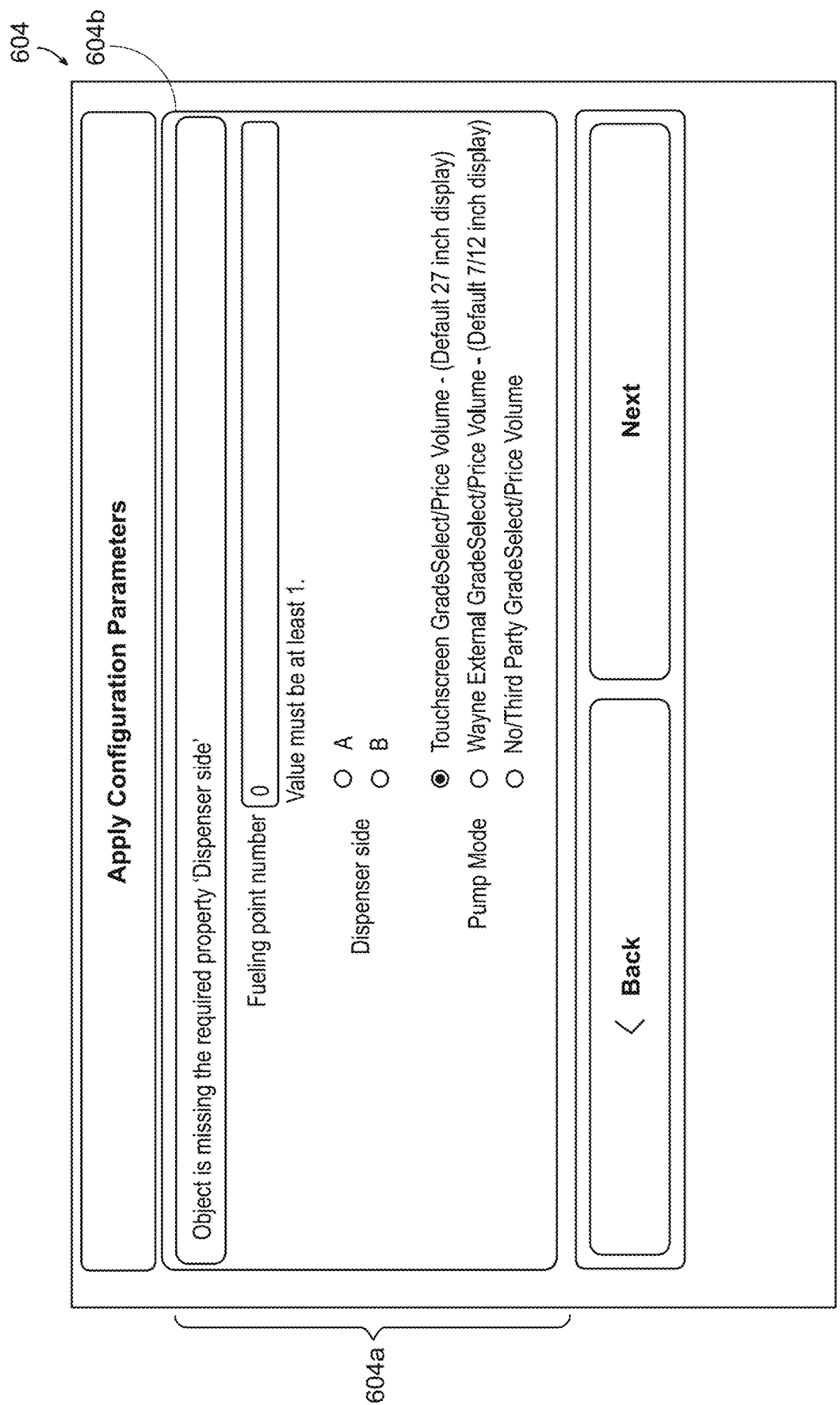
FIG. 6D is a fourth view of the exemplary graphical user interface dashboard of FIG. 6A.

FIG. 6D illustrates an exemplary graphical user interface view 604 depicted on a display of the recipient product dispenser that includes several options for specifying fuel dispenser configuration parameters. For example, as shown in this exemplary implementation, the operator can assign a fueling point number to the dispenser, a side of the recipient product dispenser, and a pump mode via interaction with selection dialog 604a. The graphical user interface can also display an error message 604b if a required configuration parameter is not selected. For example, as shown in FIG. 6D, in response to selecting the "Next" touch-screen button 604c, the error message 604b indicating that the "Object is missing the required property 'Dispenser side'" can be displayed. Similarly, for example, in response to entering a fueling point number of 0 in the selection dialog 604a, the error message "Value must be at least 1" can be displayed.

FIG. 6E, provided below, illustrates an exemplary graphical user interface view 605 depicted on a display of the recipient product dispenser that provides a summary of all configuration parameters to be saved to the second product dispenser 12b in response to the user making all required selections in selection dialog 604a and selecting the "Next" touch-screen button 604c. In some embodiments, interactions between one or more network devices and the recipient product dispenser can be further configured at this stage of the configuration application process.

Figure 6F:
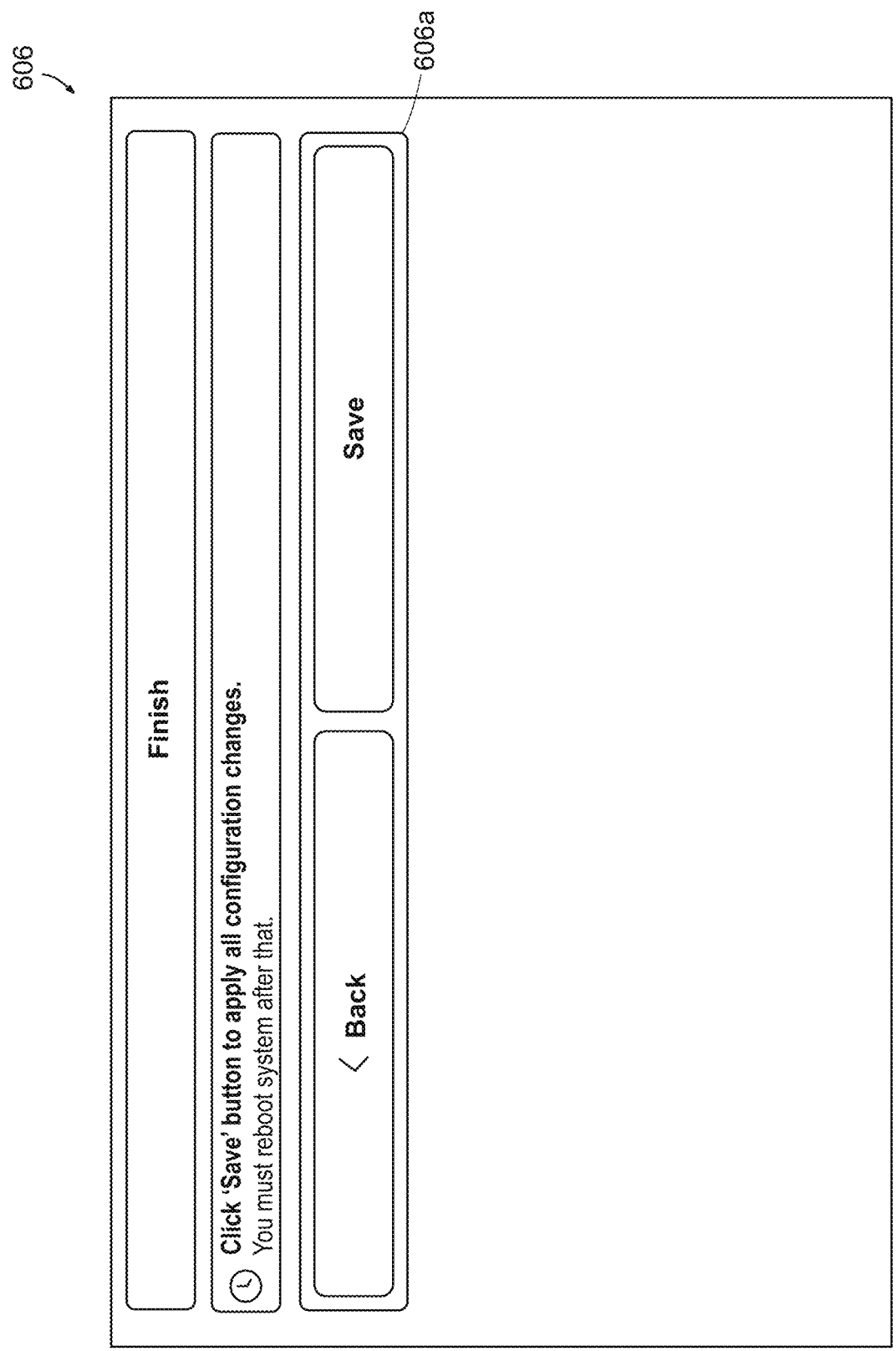
FIG. 6F is a sixth view of the exemplary graphical user interface dashboard of FIG. 6A.

FIG. 6F, provided below, illustrates an exemplary graphical user interface view 606 depicted on a display of the recipient product dispenser that enables an operator to finish the configuration of the fuel dispenser with the configuration parameters received from the originating product dispenser. As shown, the graphical user interface includes a "Save" touch-screen button 606a that the operator can select to apply the configuration of the originating product dispenser to the recipient product dispenser.

The operations of the exemplary processes discussed above with respect to FIGS. 5A-6F can be performed by at least one data processor incorporated into the product dispenser that is to be configured in accordance with these exemplary processes. The at least one data processor can perform these operations based on the execution of instructions, stored in a memory also incorporated into the product dispenser, received from a site local server located at the fueling station at which the product dispenser is located and in operable communication with the product dispenser, or received from a remote server in operable communication with the product dispenser, that can cause the at least one data processor to perform these operations.

In addition, while the functionality described in the exemplary embodiments discussed above have been described in regard to processes occurring on and/or between a first product dispenser 12a and a second product dispenser 12b that is physically separate from the first product dispenser 12a, in some embodiments, the first product dispenser 12a and the second product dispenser 12b may comprise first and second dispensing points, respectively, that are physically located on the same product dispenser housing. For example, a single product dispenser housing may include the first product dispenser 12a in the form of a first dispensing point on a first side of the product dispenser housing, and the single product dispenser housing may include a second product dispenser 12b in the form of a second dispensing point located on a second, opposite side of the product dispenser housing.

Figure 7:
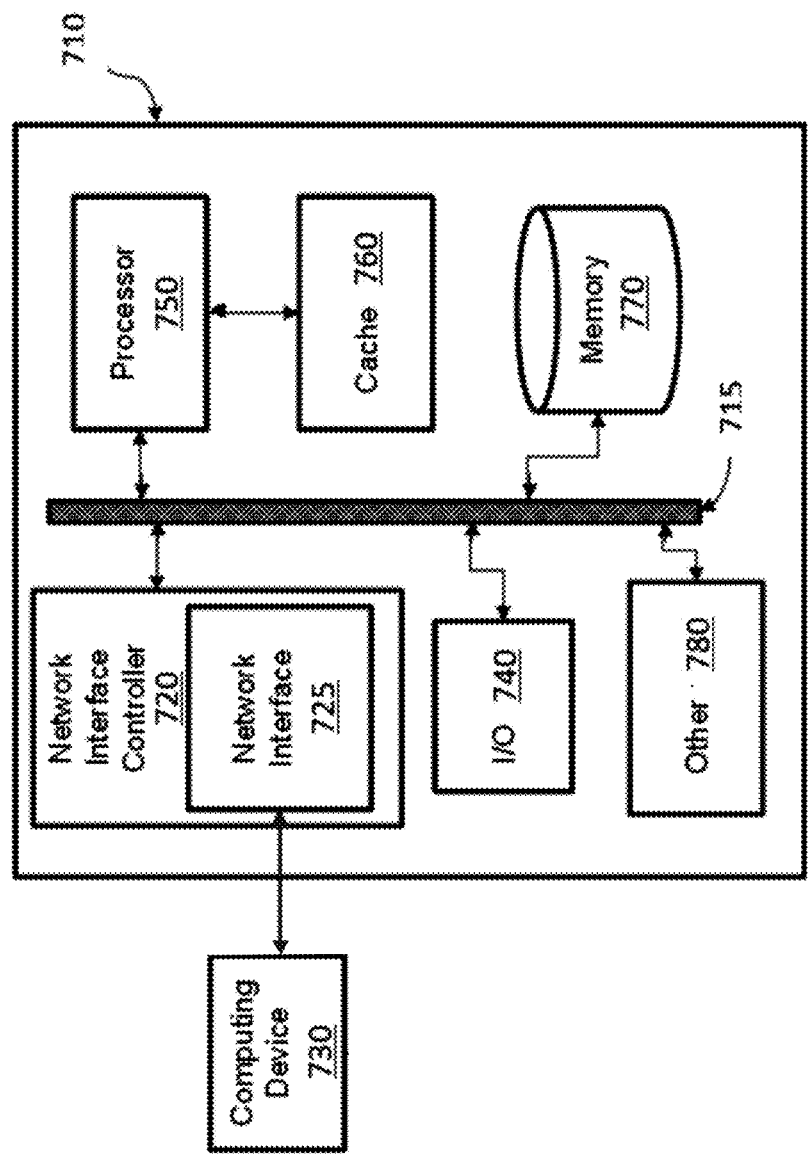
FIG. 7 is a schematic view of one implementation of a computing system.

FIG. 7 illustrates one embodiment of a computing system 710 suitable for use in implementing computerized components described herein and for the execution of one or more of the processes described herein. In broad overview, the computing system 710 includes a processor 750 configured to perform actions in accordance with instructions, and memory devices 760 and/or 770 configured to store instructions and data. The illustrated example computing system 710 includes one or more processors 750 in communication, via a bus 715, with the memory 770 and with at least one network interface controller 720 with a network interface 725 for connecting to external devices 730, e.g., a computing device (such as a mobile phone, a tablet, a laptop, a server, etc.). The one or more processors 750 are also configured to be in communication, via the bus 715, with each other and with any I/O devices at an I/O interfaces 740, and any other devices 780. The processor 750 illustrated incorporates, or is directly connected to, the cache memory 760. Generally, a processor will execute instructions received from memory. In some embodiments, the computing system 710 can be configured within a cloud computing environment, a virtual or containerized computing environment, and/or a web-based microservices environment.

In more detail, the processor 750 can be any logic circuitry that processes instructions, e.g., instructions fetched from the memory 770 or cache 760. In many embodiments, the processor 750 is an embedded processor, a microprocessor unit or special purpose processor. The computing system 710 can be based on any processor, e.g., suitable digital signal processor (DSP), or set of processors, capable of operating as described herein. In some embodiments, the processor 750 can be a single core or multi-core processor. In some embodiments, the processor 750 can be composed of multiple processors.

The memory 770 can be any device suitable for storing computer readable data. The memory 770 can be a device with fixed storage or a device for reading removable storage media. Examples include all forms of non-volatile memory, media and memory devices, semiconductor memory devices (e.g., EPROM, EEPROM, SDRAM, flash memory devices, and all types of solid state memory), magnetic disks, and magneto optical disks. A computing device 710 can have any number of memory devices 770.

The cache memory 760 is generally a form of high-speed computer memory placed in close proximity to the processor 750 for fast read/write times. In some implementations, the cache memory 760 is part of, or on the same chip as, the processor 750.

The network interface controller 720 is configured to manage data exchanges via the network interface 725. The network interface controller 720 handles the physical, media access control, and data link layers of the Open Systems Interconnect (OSI) model for network communication. In some implementations, some of the network interface controller's tasks are handled by the processor 750. In some implementations, the network interface controller 720 is part of the processor 750. In some implementations, a computing device 710 has multiple network interface controllers 720. In some implementations, the network interface 725 is a connection point for a physical network link, e.g., an RJ 45 connector. In some implementations, the network interface controller 720 supports wireless network connections and an interface port 725 is a wireless Bluetooth transceiver. Generally, a computing device 710 can be configured to exchange data with other network devices, such as computing device 730, via physical or wireless links to a network interface 725. In some implementations, the network interface controller 720 implements a network protocol such as LTE, TCP/IP Ethernet, IEEE 802.11, IEEE 802.16, Bluetooth, or the like.

The other computing devices 730 are connected to the computing device 710 via a network interface port 725. The other computing device 730 can be a peer computing device, a network device, a server, or any other computing device with network functionality. For example, a computing device 730 can be a computing device associated with a user of a product dispenser or other terminal. In some embodiments, the computing device 730 can be a network device such as a hub, a bridge, a switch, or a router, connecting the computing device 710 to a data network such as the Internet.

In some uses, the I/O interface 740 supports an input device and/or an output device (not shown). In some uses, the input device and the output device are integrated into the same hardware, e.g., as in a touch screen. In some uses, such as in a server context, there is no I/O interface 740 or the I/O interface 740 is not used. In some uses, additional other components 780 are in communication with the computer system 710, e.g., external devices connected via a universal serial bus (USB).

The other devices 980 can include an I/O interface 740, external serial device ports, and any additional co-processors. For example, a computing system 710 can include an interface (e.g., a universal serial bus (USB) interface, or the like) configured to connect input devices (e.g., a keyboard, microphone, mouse, or other pointing device), output devices (e.g., video display, speaker, refreshable Braille terminal, or printer), or additional memory devices (e.g., portable flash drive or external media drive). In some implementations an I/O device is incorporated into the computing system 710, e.g., a touch screen on a tablet device. In some implementations, a computing device 710 includes an additional device 780 such as a co-processor, e.g., a math co-processor that is configured to assist the processor 750 with high precision or complex calculations.

One skilled in the art will appreciate further features and advantages of the devices, systems, and methods based on the above-described embodiments. Accordingly, this disclosure is not to be limited by what has been particularly shown and described, except as indicated by the appended claims. All publications and references cited herein are expressly incorporated herein by reference in their entirety for all purposes.

Those skilled in the art will understand that the systems, devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

The present disclosure has been described above by way of example only within the context of the overall disclosure provided herein. It will be appreciated that modifications within the spirit and scope of the claims may be made without departing from the overall scope of the present disclosure.

What is claimed is:

1. A system, comprising:
    a first product dispenser located at a product dispensing station configured to dispense products to an automotive vehicle, the first product dispenser having first components for delivery of a product to a dispensing station user, the first components configured for the delivery of the product in accordance with a first configuration;
    a second product dispenser located at the product dispensing station and having second components for the delivery of a product to a dispensing station user, the second components configured for the delivery of the product; and
    a site local server located at the product dispensing station and in operable communication with each of the first product dispenser and the second product dispenser, the site local server configured to receive configuration data characterizing the first configuration and to transmit the configuration data to the second product dispenser,
    wherein the second product dispenser is configured to execute instructions that cause the second components to be configured for the delivery of the product in accordance with the first configuration.

2. The system of claim 1, wherein the second components are initially configured for the delivery of the product in accordance with a second configuration differing from the first configuration, and wherein the second product dispenser is configured to execute instructions that cause the second components to be reconfigured for the delivery of the product in accordance with the first configuration.

3. The system of claim 1, wherein the second product dispenser includes a graphical display configured to operate a graphical user interface for configuring the second components and to receive user inputs thereon, and wherein the second product dispenser is configured to execute the instructions in response to receipt of the user input at the graphical display.

4. The system of claim 1, wherein the site local server is configured to determine the instructions and to provide the instructions to the second product dispenser, and wherein the instructions are executed by the second product dispenser in response to receiving the instructions from the site local server.

5. The system of claim 1, wherein the configuration data characterizes a configuration of a payment terminal of the first product dispenser.

6. The system of claim 1, wherein the configuration data characterizes one or more networking settings of the first product dispenser.

7. The system of claim 1, wherein the configuration data characterizes a configuration of an operating platform of the first product dispenser.

8. The system of claim 1, wherein the first product dispenser is configured to transmit the configuration data to the site local server.

9. The system of claim 8, wherein the first product dispenser is configured to receive, from the site local server, a command that causes the first product dispenser to transmit the configuration data to the site local server.

10. The system of claim 1, wherein the site local server is operably coupled to the first product dispenser and the second product dispenser.

11. A computer-implemented method, comprising:
    receiving, from a site local server located at a product dispensing station configured to dispense products to an automotive vehicle and by a first product dispenser located at the product dispensing station, configuration data characterizing a configuration of a second product dispenser located at the product dispensing station, the first product dispenser featuring first components configured for the delivery of a product; and
    executing computational instructions that cause the first components to be configured for the delivery of the product in accordance with the configuration.

12. The computer-implemented method of claim 11, wherein the first components are initially configured for the delivery of the product in accordance with a second configuration differing from the configuration, and wherein the computational instructions, when executed, cause the first components to be reconfigured for the delivery of the product in accordance with the configuration.

13. The computer-implemented method of claim 11, wherein the first product dispenser includes a graphical display configured to operate a graphical user interface for configuring the first components and to receive user inputs thereon, and wherein the computational instructions are executed in response to receipt of the user input at the graphical display.

14. The computer-implemented method of claim 11, wherein the site local server is configured to determine the computational instructions, and wherein the computational instructions are executed by the first product dispenser in response to receiving the computational instructions from the site local server.

15. The computer-implemented method of claim 11, wherein the configuration data characterizes a configuration of a payment terminal of the second product dispenser.

16. The computer-implemented method of claim 11, wherein the configuration data characterizes one or more networking settings of the second product dispenser.

17. The computer-implemented method of claim 11, wherein the configuration data characterizes a configuration of an operating platform of the second product dispenser.

18. The computer-implemented method of claim 11, further comprising:
   receiving, by the site local server and from the second product dispenser, the configuration data.

19. The computer-implemented method of claim 18, further comprising:
   receiving, by the second product dispenser and from the site local server, a command that causes the second product dispenser to transmit the configuration data to the site local server.

20. The computer-implemented method of claim 11, wherein the site local server is operably coupled to the first product dispenser and the second product dispenser.

\* \* \* \* \*